(12) United States Patent
Kumagai

(10) Patent No.: US 6,288,869 B1
(45) Date of Patent: *Sep. 11, 2001

(54) STRUCTURE FOR PREVENTING MISINSERTION OF DISC CARTRIDGES

(75) Inventor: Hideaki Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,395

(22) Filed: May 12, 2000

Related U.S. Application Data

(62) Division of application No. 09/114,754, filed on Jul. 13, 1998.

(30) Foreign Application Priority Data

Jul. 14, 1997 (JP) .............................................. P09-188250

(51) Int. Cl.⁷ .................................................. G11B 17/02
(52) U.S. Cl. .......................................................... 360/99.06
(58) Field of Search ............................... 360/99.02, 99.03, 360/99.06, 99.07, 94; 369/52, 79

(56) References Cited

U.S. PATENT DOCUMENTS 6,115,212 * 9/2000 Kumagai ........................... 360/99.06

* cited by examiner

*Primary Examiner*—Robert S. Tupper
(74) *Attorney, Agent, or Firm*—Oblon, Spivak, McClelland, Maier & Neustadt, P.C.

(57) ABSTRACT

A disc cartridge includes a shell having one side face and an opening, a shutter mounted to the shell to be slidable along the one side face between a first position where the shutter closes the opening and a second position where the shutter opens the opening, and a misinsertion preventing portion arranged with the one side face of the shell in a portion thereof out of a slide area of the shutter and having a recess for allowing introduction of a misinsertion preventing member of a drive.

3 Claims, 48 Drawing Sheets

STRUCTURE FOR PREVENTING MISINSERTION OF DISC CARTRIDGES

This application is a division of U.S. application Ser. No. 09/114,754, filed Jul. 13, 1998.

BACKGROUND OF THE INVENTION

The present invention relates generally to a drive for discs such as a floppy disc having high storage capacity received in cartridges, and more particularly, to a structure for preventing misinsertion of such disc cartridges.

Referring to FIGS. 38–39, a known 3.5" microfloppy-disc cartridge 201 or first recording-medium cartridge of first format includes a disc-like recording medium 202, a shell 203 rotatably accommodating the disc-like recording medium 202, and a shutter 204 slidably mounted to the shell 203 to close a head opening 203a formed in upper and lower halves of the shell 203.

The shell 203 is formed substantially like a flat rectangular parallelopiped, and has a front end face 203b as viewed in the direction of insertion in a cartridge holder 302 of a first drive 301. A groove 203c is formed in the front end face 203b to make a protrusion 309 of a shutter opening member 303 of the cartridge holder 302 contact one end 204a of the shutter 204. Moreover, an inclination 203e is formed at one end of the front end face 203b by slantingly cutting a corner thereof.

The first drive 301 for the first recording-medium cartridge 201 includes a cartridge holder 302 for holding the first recording-medium cartridge 201 as inserted therein and moving it between an insertion position and a loading position, the shutter opening member 303 mounted to the cartridge holder 302 to open the shutter 204 of the first recording-medium cartridge 201, a lifting member 304 for lifting the cartridge holder 302, a trigger lever or lock lever 305 for locking the lifting member 304 in a cartridge-holder lifting position, and an anti-misinsertion member 306 which when inserting in the cartridge holder 302 the first recording-medium cartridge 201 in a normal position, cooperates with the inclination 203e to allow loading of the first recording-medium cartridge 201.

Referring to FIG. 40, the shutter opening member 303 has one end rotatably mounted to a chassis 308, and another end or free end integrated with the shutter engaging protrusion 309. The shutter opening member 303 is formed with the trigger lever 305 in the vicinity of the shutter engaging protrusion 309. The shutter opening member 303, which receives a torque from a torsion coil spring 310, is set so that the shutter engaging protrusion 309 is introduced in the groove 203c of the first recording-medium cartridge 201 inserted in the cartridge holder 302, and the trigger lever 305 is positioned to be engaged with a lever engagement 304a of the lifting member 304.

The anti-misinsertion member 306, which is in the form of a torsion coil spring, includes a coil 306a engaged with a first spring engagement 302a arranged on the upper side of the cartridge holder 302. The coil 306a includes a first arm 306b extending from one end and engaged with a second spring engagement 302b arranged on the upper side of the cartridge holder 302, and a second arm 306c extending to a cartridge opening of the cartridge holder 302 along one side face thereof and having an end bent substantially at right angles to form a cartridge contact 306d. The cartridge contact 306d is entered in the cartridge holder 302 through a recess 302c formed in the upper side of the cartridge holder 302 to contact the inclination 203e of the first recording-medium cartridge 201 inserted in the cartridge holder 302.

With the first drive 301, referring to FIG. 41, when inserting in the cartridge holder 302 the first recording-medium cartridge 201 in a normal position, the cartridge contact 306d of the second arm 306c of the anti-misinsertion member 306 contacts the inclination 203e of the first recording-medium cartridge 201, and turns to the outside of the first recording-medium cartridge 201 to allow further insertion thereof in the cartridge holder 302.

Referring to FIG. 42, when inserting further in the cartridge holder 302 the first recording-medium cartridge 201, the shutter engaging protrusion 309 of the shutter opening member 303 is introduced in the groove 203c formed in the front end face of the first recording-medium cartridge 201, contacting the one end 204a of the shutter 204. When inserting further the first recording-medium cartridge 201, the shutter opening member 303 is rotated against a force of the torsion coil spring 310 to open the shutter 204. Referring to FIG. 43, as soon as the shutter 204 is opened, engagement of the trigger lever 305 with the lever engagement 304a of the lifting member 304 is released, so that the lifting member 304 is slid by a force of a biasing spring, not shown, to move downward the cartridge holder 302, chucking on a spindle the disc-like recording medium 202 of the first recording-medium cartridge 201.

On the other hand, referring to FIG. 44, when inserting in the cartridge holder 302 of the first drive 301 the first recording-medium cartridge 201 in other position than a normal position, the cartridge contact 206d of the anti-misinsertion member 306 does not contact the inclination 203e of the first recording-medium cartridge 201, and therefore cannot turn to the outside of the first recording-medium cartridge 201. Thus, the second arm 306c of the anti-misinsertion member 306 becomes in the stretched state to prevent insertion of the first recording-medium cartridge 201 in the cartridge holder 302.

In addition to the first drive 301 for the first recording-medium cartridge 201 as shown in FIGS. 38 and 40–44, there is known a first drive as shown in FIGS. 45–54.

The first recording-medium cartridge 201 driven by the first drive 301 has a concavity 211 for introducing a shutter engaging protrusion 309 of a shutter opening member 303 in a portion of a front end face 203b of a shell 203, which is closed by a shutter 204 upon shutter closing and faces outside upon shutter opening.

The first drive 301 includes a shutter opening member 303 having a shutter engaging protrusion 309, and a trigger lever 305 arranged separately. The first drive 301 as shown in FIGS. 45–54 is referred to as a first drive of a separate trigger type with respect to the first drive of an integrated trigger type as shown in FIGS. 39–44.

Referring to FIG. 47, the shutter opening member 303 has one end rotatably mounted to a cartridge holder 302 by a shaft 307, and another end or free end formed with the shutter engaging protrusion 309. The shutter opening member 303 receives a torque from a coil spring 311 so that the shutter engaging protrusion 309 contacts one end of a circular long hole 302d formed in the upper side of the cartridge holder 302.

On the other hand, the trigger lever 305 has one end rotatably mounted to a chassis 308 by a shaft 321, and another end or free end formed with an engagement 322 engaged with a lifting member 304. The trigger lever 305 is formed, in the vicinity of the engagement 322, with a pressed portion 323 pressed by the front end face of the first recording-medium cartridge 201 inserted in the cartridge holder 302. The trigger lever 305 receives a torque from a torsion coil spring 324 in the direction of engaging the engagement 322 with a lever engagement 304a of the lifting member 304.

Referring to FIGS. 48–49, when inserting the first recording-medium cartridge 201 in the first drive 301 of a separate trigger type, the shutter engaging protrusion 309 of the shutter opening member 303 of the first drive 301 is introduced in the groove 203c of the first recording-medium cartridge 201 formed in the front end face of the first recording-medium cartridge 201, contacting one end 204a of the shutter 204.

Referring to FIGS. 50–51, when inserting further the first recording-medium cartridge 201, the shutter opening member 303 is rotated against a force of the coil spring 311 to open the shutter 204. When the shutter 204 is opened, and the shutter engaging protrusion 309 faces the concavity 211 formed in the front end face of the first recording-medium cartridge 201, the first recording-medium cartridge 201 is inserted further in the cartridge holder 302 with the shutter engaging protrusion 309 being introduced in the concavity 211. Referring to FIGS. 52–53, the front end face of the shell 203 presses the pressed portion 323 of the trigger lever 305 to rotate the trigger lever 305 against a force of the torsion coil spring 324. Thus, engagement of the engagement 322 with the lever engagement 304a of the lifting member 304 is released, so that the lifting member 304 with lock by the trigger lever 305 removed is slid by a force of a biasing spring to move downward the cartridge holder 302, chucking on a spindle the disc-like recording medium 202 of the first recording-medium cartridge 201.

On the other hand, referring to FIG. 54, when inserting in the cartridge holder 302 of the first drive 301 the first recording-medium cartridge 201 in other position than a normal position, the concavity 211 of the first recording-medium cartridge 201 is not positioned to correspond to the shutter engaging protrusion 309 of the shutter opening member 303. Thus, due to stopper function of the shutter opening member 303, the first recording-medium cartridge 201 cannot be inserted further in the cartridge holder 302, and therefore cannot press the pressed portion 323 of the trigger lever 305, preventing misinsertion of the first recording-medium cartridge 201.

With an enlargement of the application field and sphere of recording-medium cartridges such as a disc cartridge, there is an increasing demand on an achievement of a second recording-medium cartridge of second format having a storage capacity far greater than that of the known first recording-medium cartridge of first format, and a second or superordinate drive for the second recording-medium cartridge. It is demanded that the second drive allows recording/reproducing of the first or subordinate recording-medium cartridge, i.e. has a subordination compatibility, and that the first drive disallows insertion of the second recording-medium cartridge.

The second recording-medium cartridge should be rotated at a speed several to several tens times as high as the first recording-medium cartridge, and thus has a magnetic film with modified surface roughness and thickness and a recording format modified. Therefore, data in the second recording-medium cartridge cannot be read out by the first drive.

Due to impossible readout of data recorded on a recording medium in the second recording-medium cartridge as described above, the fist drive may, when receiving the second recording-medium cartridge, arbitrarily determine that no data are recorded on the recording medium to carry out reformatting thereof, erasing data recorded.

Note that when using the shell of the first recording-medium cartridge for the shell of the second recording-medium cartridge, the second recording-medium cartridge is loaded in the first drive.

It is, therefore, an object of the present invention to provide a second drive which allows loading of first and second recording-medium cartridges, i.e. has a subordination compatibility, and a first drive which disallows loading of the second recording-medium cartridge.

SUMMARY OF THE INVENTION

One aspect of the present invention lies in providing a disc cartridge comprising:

a shell shaped substantially like a flat rectangular parallelopiped, said shell having one side face and an opening;

a shutter mounted to said shell, said shutter being slidable along said one side face between a first position where said shutter closes said opening and a second position where said shutter opens said opening; and a misinsertion preventing portion arranged with said one side face of said shell in a portion thereof out of a slide area of said shutter and having a recess for allowing introduction of a misinsertion preventing member of a drive.

Another aspect of the present invention lies in providing a system, comprising:

a first cartridge with a recording medium of first format;

a first drive arranged for said first cartridge;

a second cartridge with a recording medium of second format;

a second drive arranged for said first and second cartridges;

a first device arranged with said first cartridge, said first device being in a form of an inclination arranged at a corner of a front end face of said first cartridge as viewed in a direction of insertion of said first cartridge in said first drive, said first device allowing loading of said first cartridge into said first drive when said first cartridge is inserted in a normal position; and a second device arranged with said second cartridge and said second drive, said second device including a grooved portion of a front end face of said second cartridge as viewed in a direction of insertion of said second cartridge in said second drive, said grooved portion corresponding to said corner of said first cartridge, said second device including a member which cooperates with said first device to allow loading of said first cartridge into said second drive when said first cartridge is inserted in a normal position and with said groove portion of said second cartridge to allow loading of said second cartridge into said second drive when said second cartridge is inserted in a normal position.

Still another aspect of the present invention lies in providing a drive for a first cartridge with a recording medium of first format and a second cartridge with a recording medium of second format, said drive comprising:

a cartridge holder, said cartridge holder holding and moving the cartridge between an insertion position and a loading position;

a misinsertion preventing member rotatably mounted to said cartridge holder, said misinsertion preventing member being formed with a protrusion; and biasing means for biasing said misinsertion preventing member to rotate in a first direction, wherein when inserting in the drive the first cartridge in a normal position, said protrusion of said misinsertion preventing member is engaged with an inclined corner of said first cartridge to rotate said misinsertion preventing member in a second direction against said biasing means to allow loading of the first cartridge into the drive, wherein when inserting in the drive the second cartridge in a normal position, said protrusion of said misinsertion preventing member is inserted in a groove formed in the second cartridge at a corner thereof corresponding to said inclined corner of said first cartridge and being different in shape from said inclined corner to allow loading of the second cartridge into the drive.

DETAILED DESCRIPTION OF THE INVENTION

Figure 1:
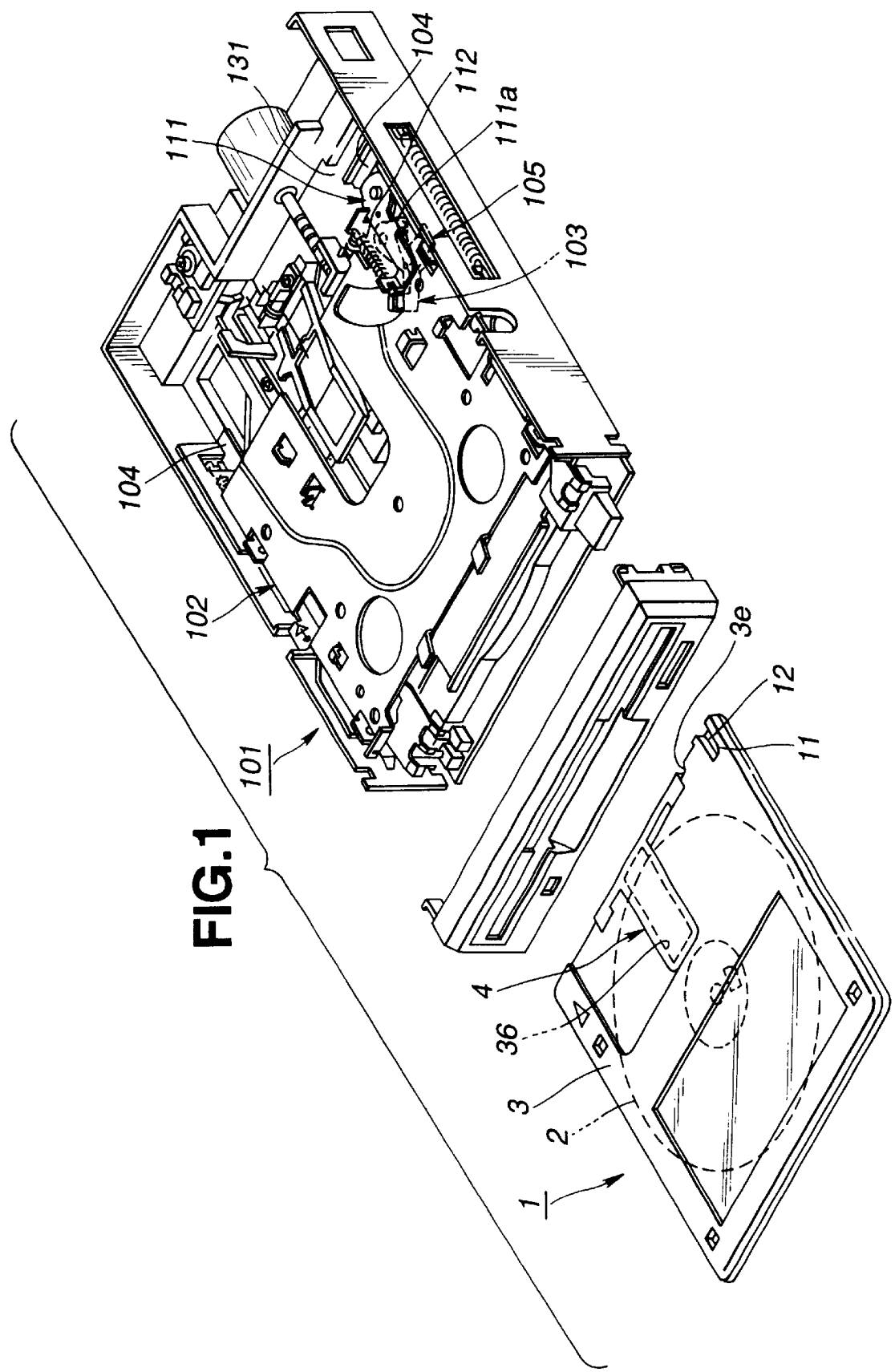
FIG. 1 is a perspective view showing a second recording-medium cartridge and a second drive.

Referring to FIG. 1, a disc or second recording-medium cartridge 1 of second format is driven by a second drive 101. The second recording-medium cartridge 1 includes a disc-like recording medium 2, a shell 3 rotatably accommodating the disc-like recording medium 2 and formed substantially like a flat rectangular parallelopiped, and a shutter 4 slidably mounted to the shell 3 along one side face thereof to close a head opening 36 formed in the shell 3.

The shell 3 has, on the one side face in a portion out of a slide area of the shutter 4, an anti-misinsertion portion 11 with a groove 12 for allowing introduction of an anti-misinsertion member 111 of the drive 101.

The second drive 101 includes a cartridge holder 102 for holding the first (or second) recording-medium cartridge 1 (or 201) as inserted therein and vertically moving it between an insertion position and a loading position, a shutter opening member 103 mounted to a chassis 131 to open the shutter of the recording-medium cartridge 1, a lifting member or slide plate 104 for lifting the cartridge holder 102, a trigger member 105 pressed by the front end face of the recording-medium cartridge 1 inserted in the cartridge holder 102 to remove lock for the lifting member 104, an anti-misinsertion member 111 rotatably mounted to the upper side of the cartridge holder 102 and having a protrusion 111a entered therein, and a coil spring 112 for biasing the anti-misinsertion member 111 to rotate in a first direction.

Figure 2:
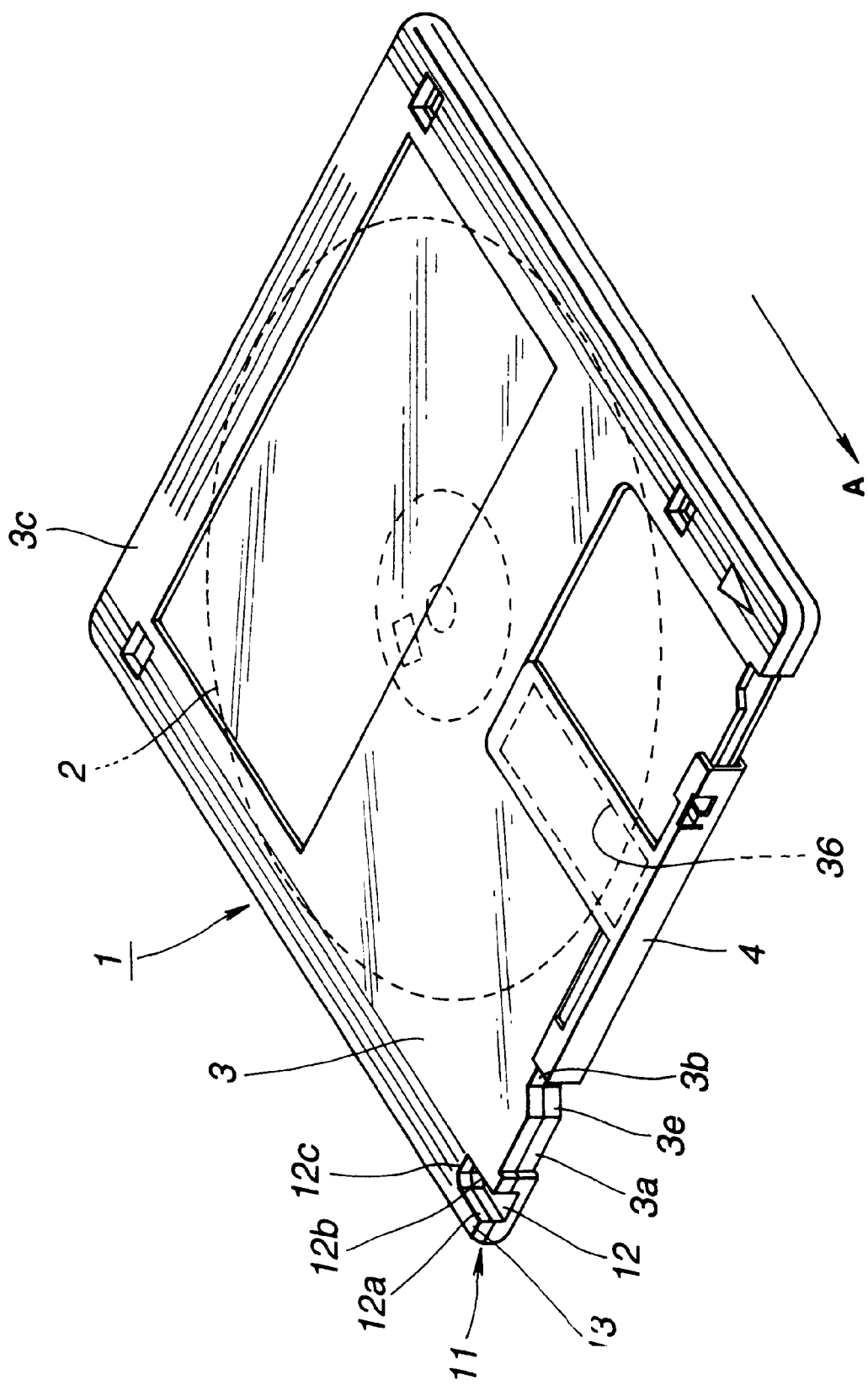
FIG. 2 is a view similar to FIG. 1, showing the second recording-medium cartridge with a shutter closed.
Figure 3:
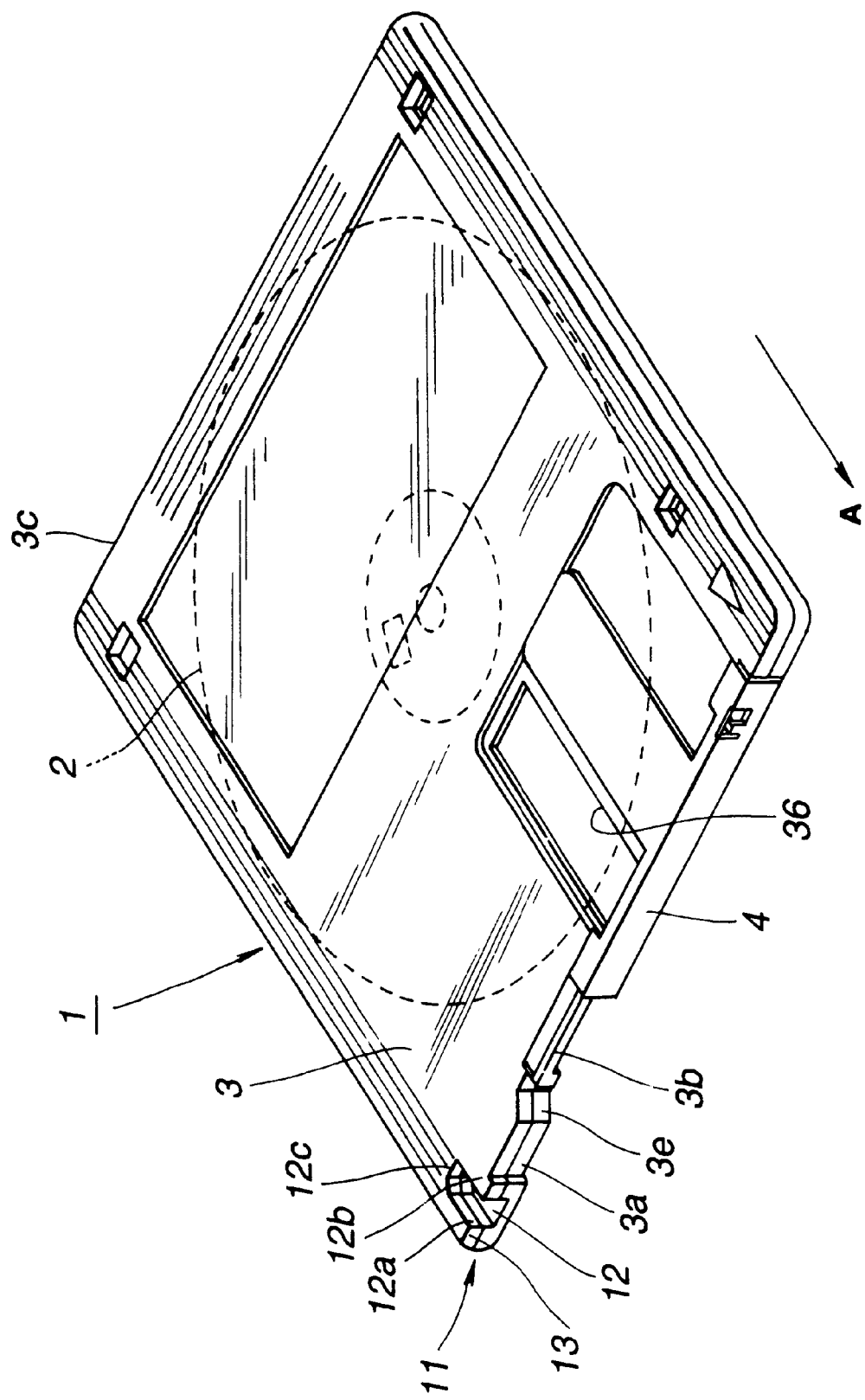
FIG. 3 is a view similar to FIG. 2, showing the second recording-medium cartridge with the shutter opened.
Figure 4:
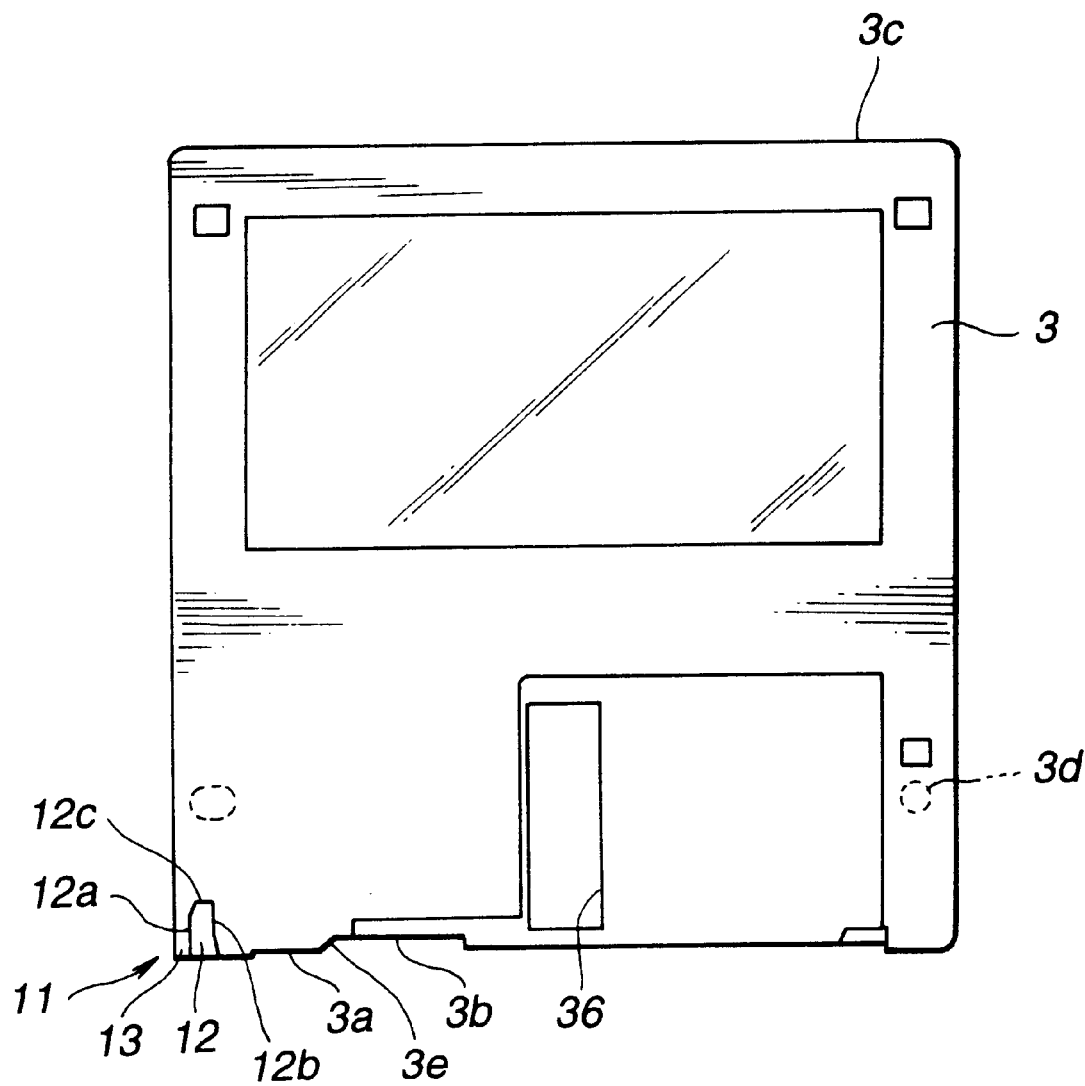
FIG. 4 is a plan view showing a shell.
Figure 5:
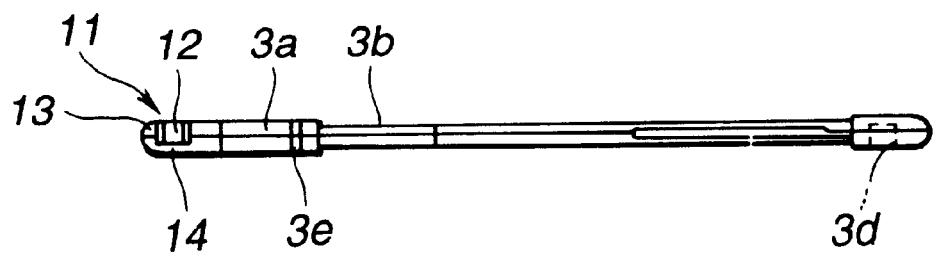
FIG. 5 is a front view showing the shell.
Figure 45:
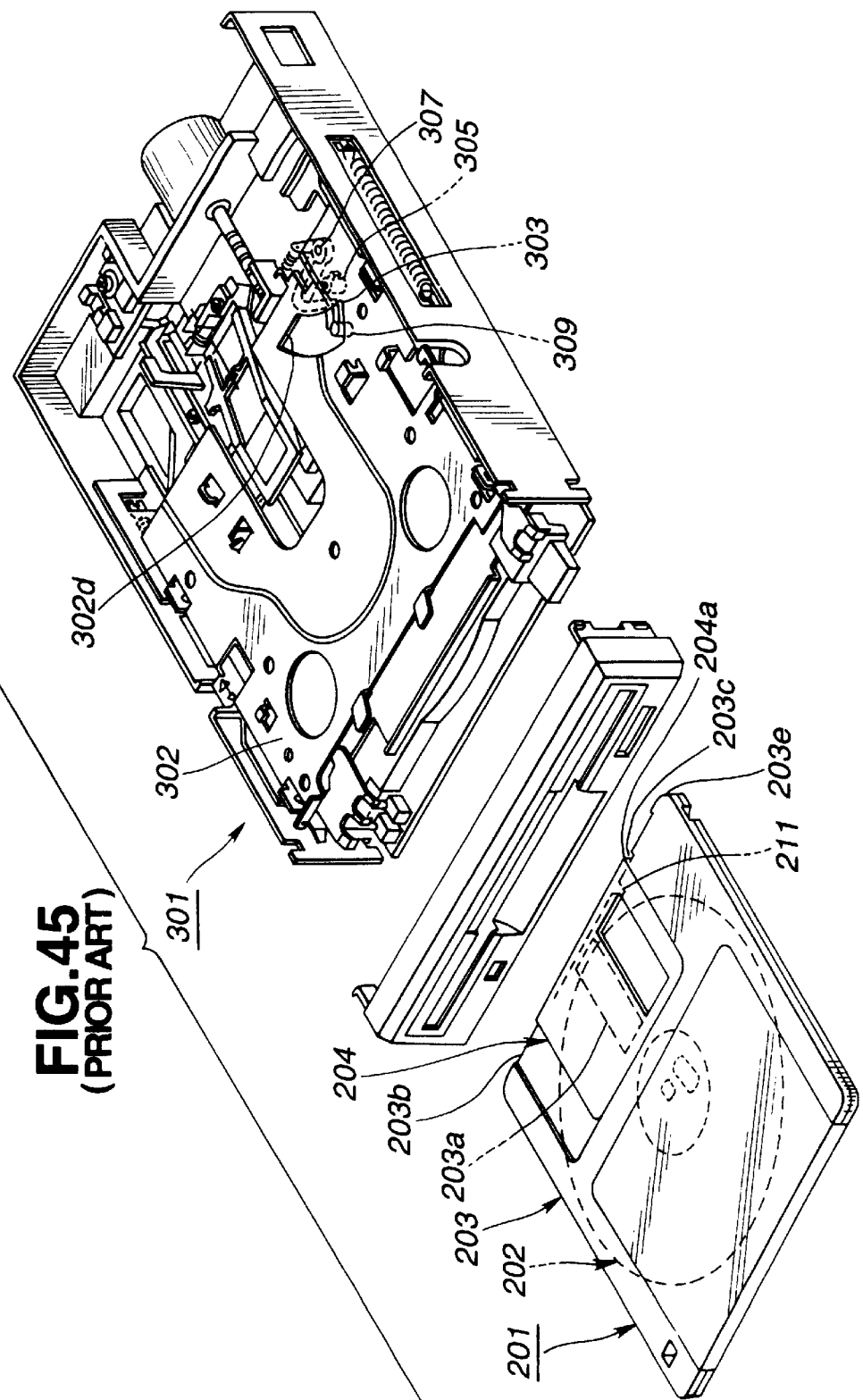
FIG. 45 is a view similar to FIG. 38, showing the known first recording-medium cartridge and first drive.
Figure 46:
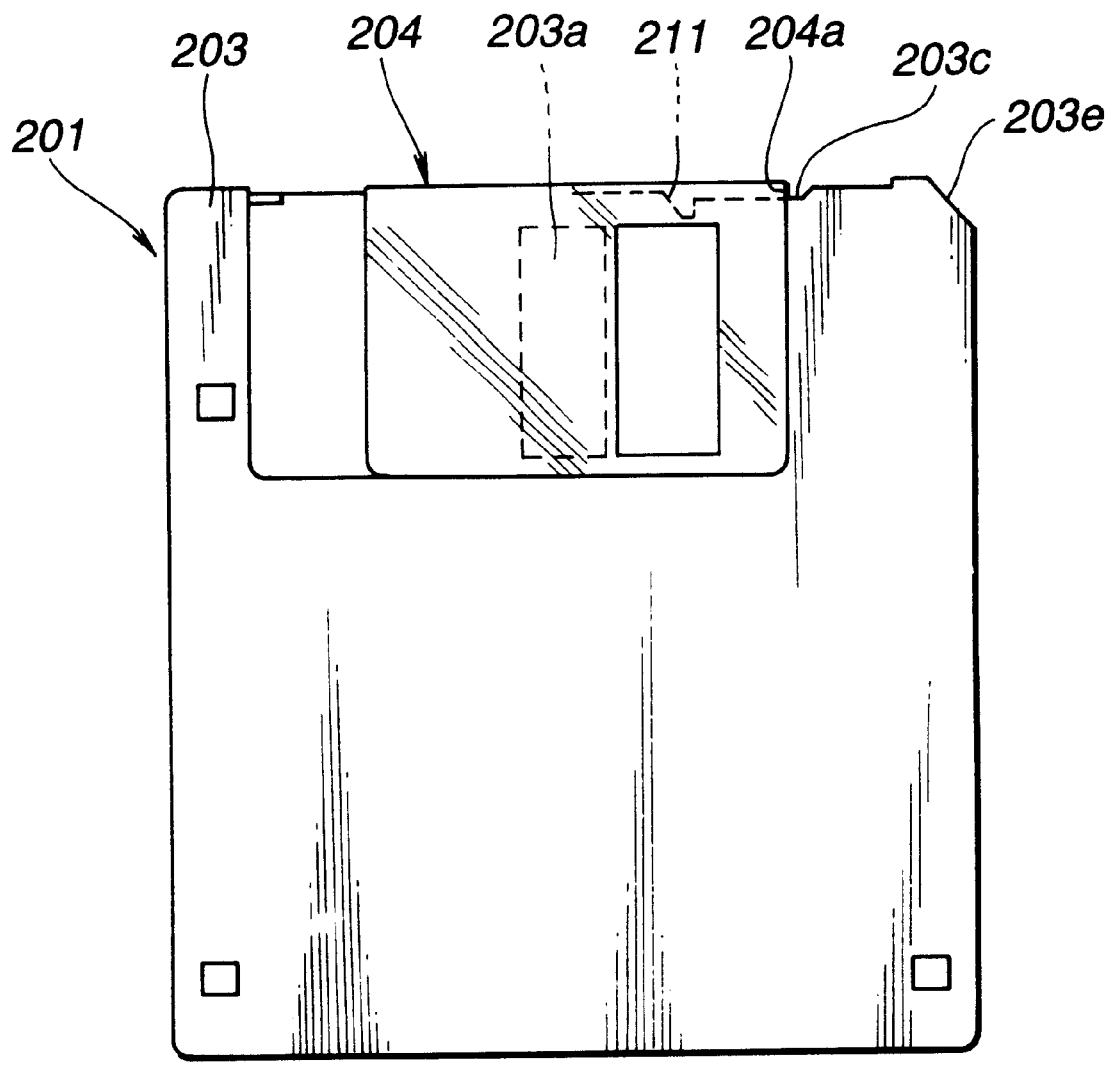
FIG. 46 is a view similar to FIG. 39, showing the known first recording-medium cartridge.
Figure 47:
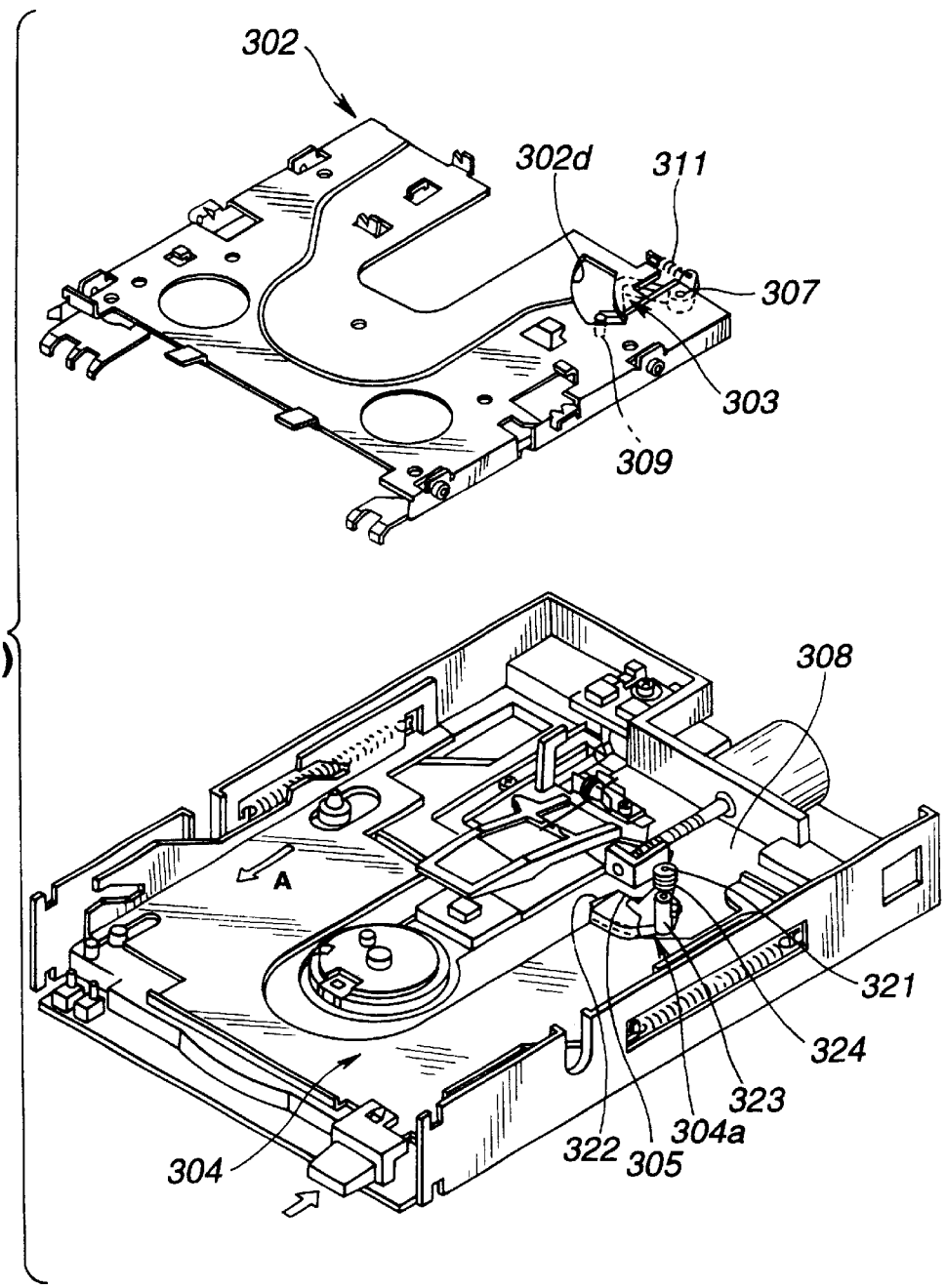
FIG. 47 is a view similar to FIG. 40, showing the known first drive.
Figure 48:
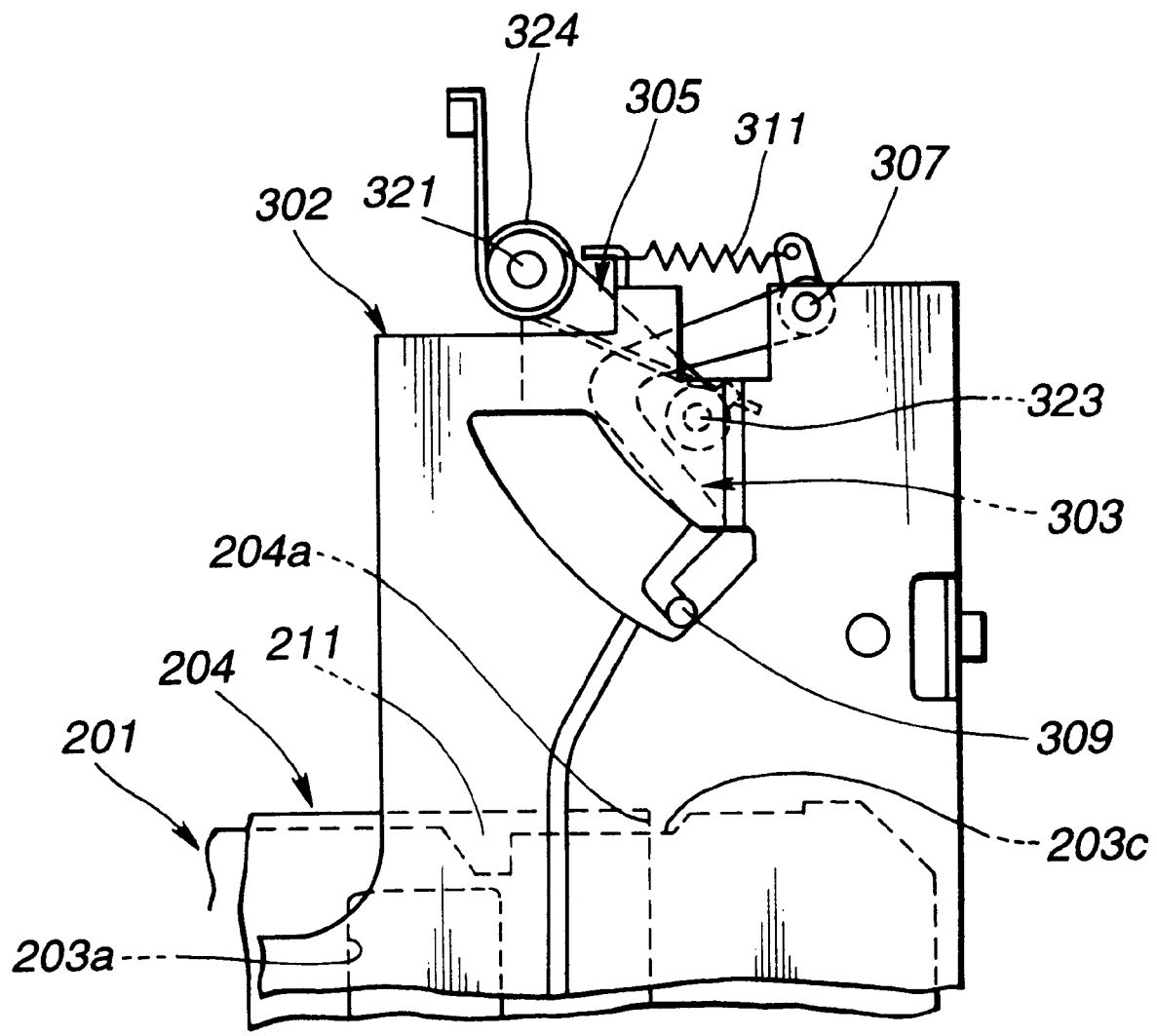
FIG. 48 is a view similar to FIG. 44, showing the known first recording-medium cartridge when being properly inserted in the known first drive.
Figure 49:
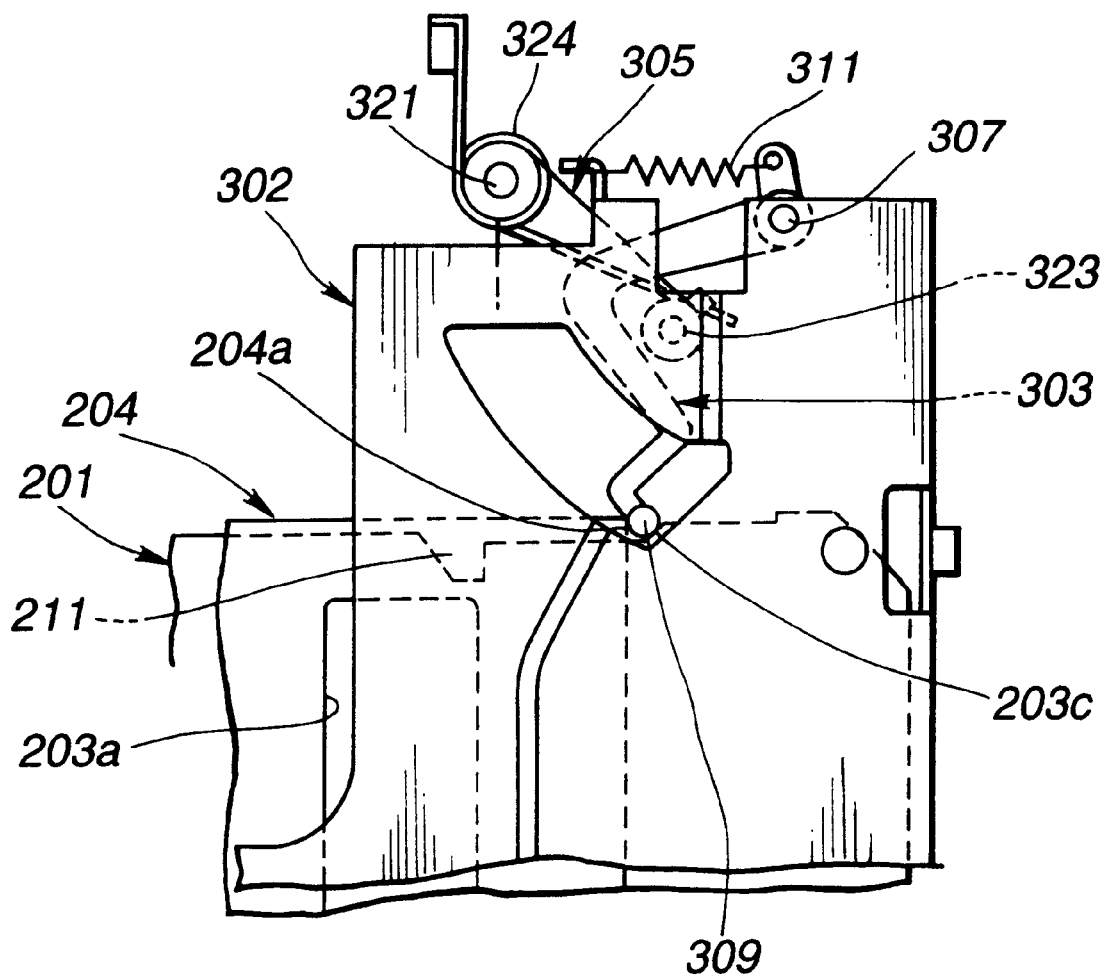
FIG. 49 is a view similar to FIG. 48, showing the known first recording-medium cartridge when being properly inserted in the known first drive.
Figure 50:
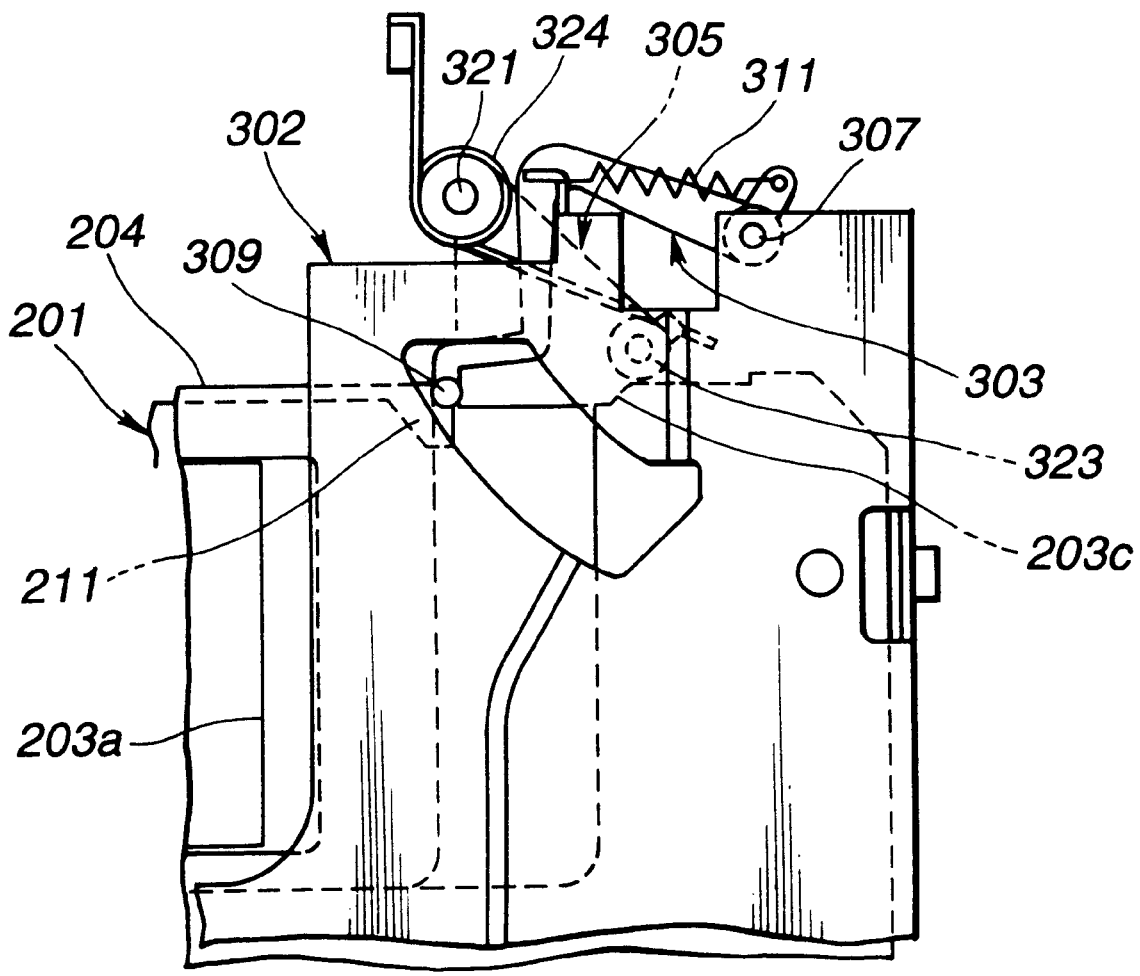
FIG. 50 is a view similar to FIG. 49, showing the known first recording-medium cartridge when being properly inserted in the known first drive.
Figure 51:
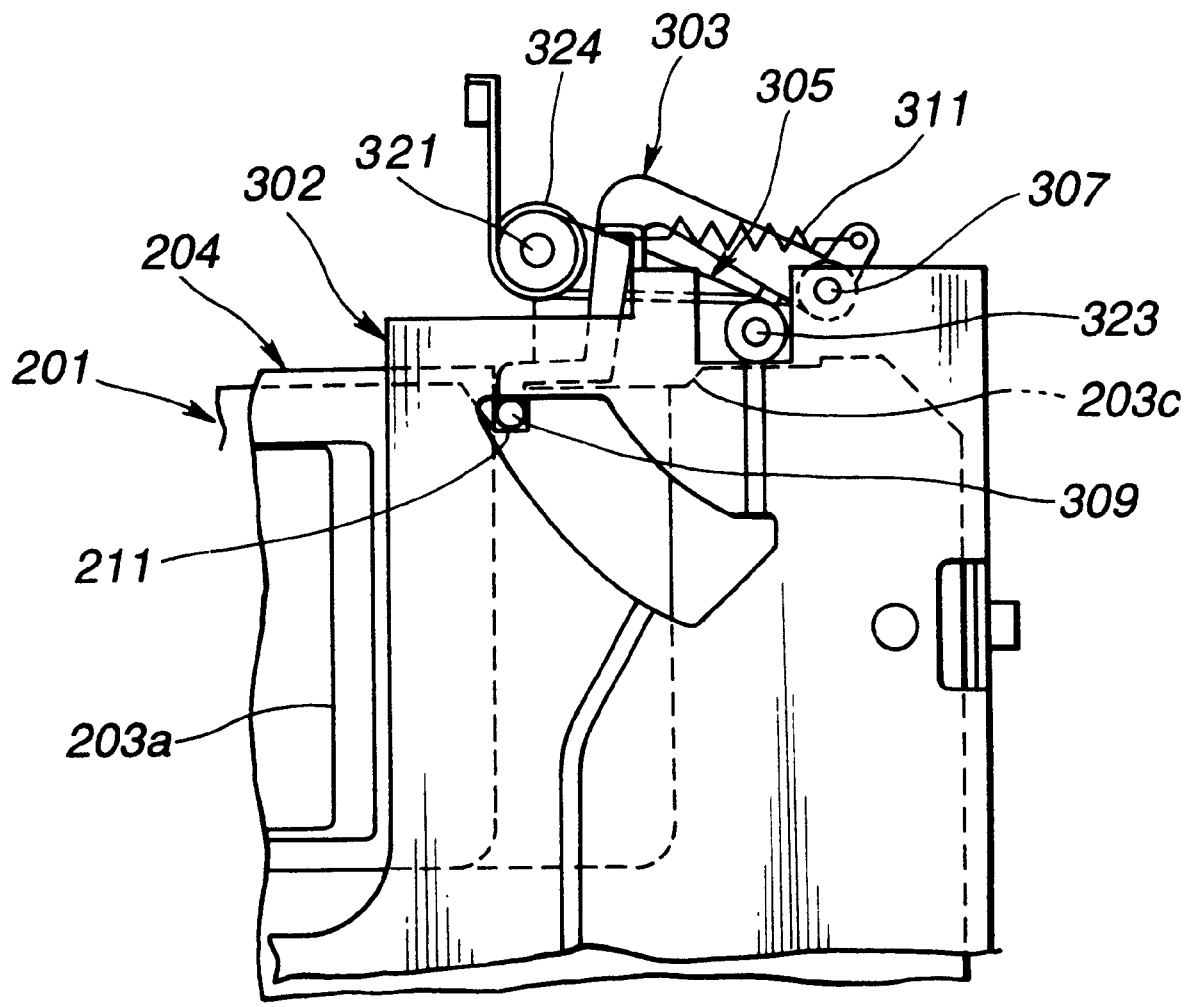
FIG. 51 is a view similar to FIG. 50, showing the known first recording-medium cartridge when being properly inserted in the known first drive.
Figure 52:
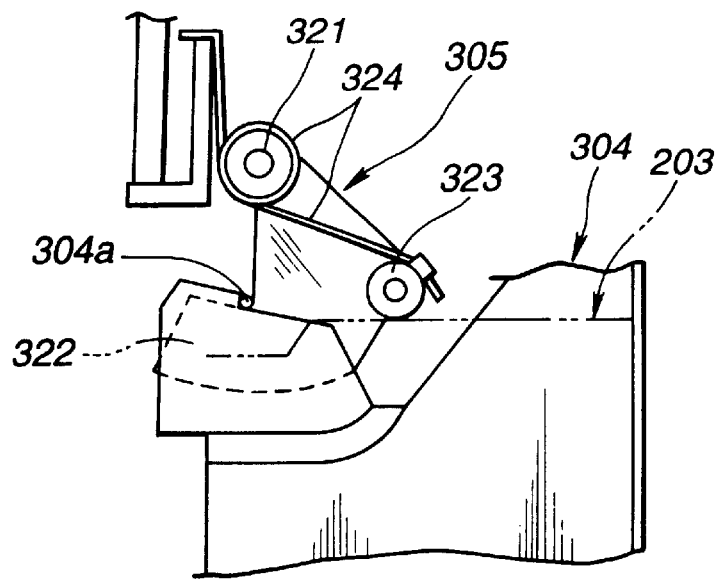
FIG. 52 is a view similar to FIG. 46, showing a known trigger lever.
Figure 53:
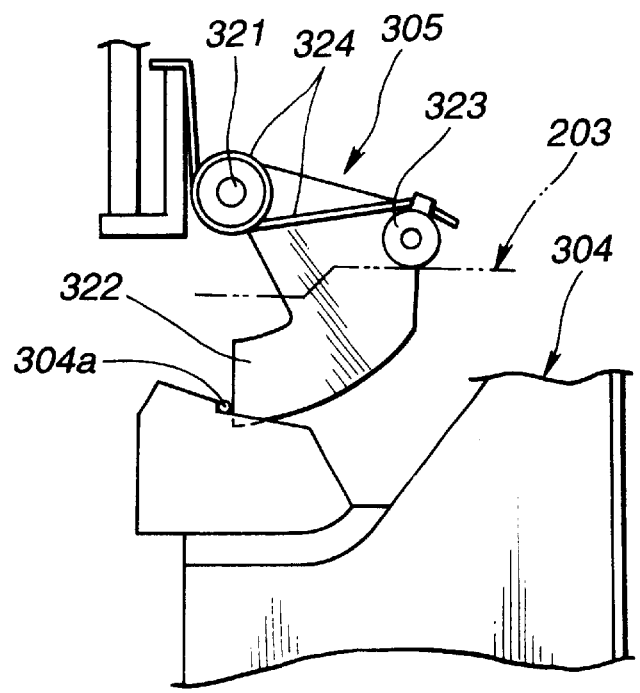
FIG. 53 is a view similar to FIG. 52, showing the known trigger lever.
Figure 54:
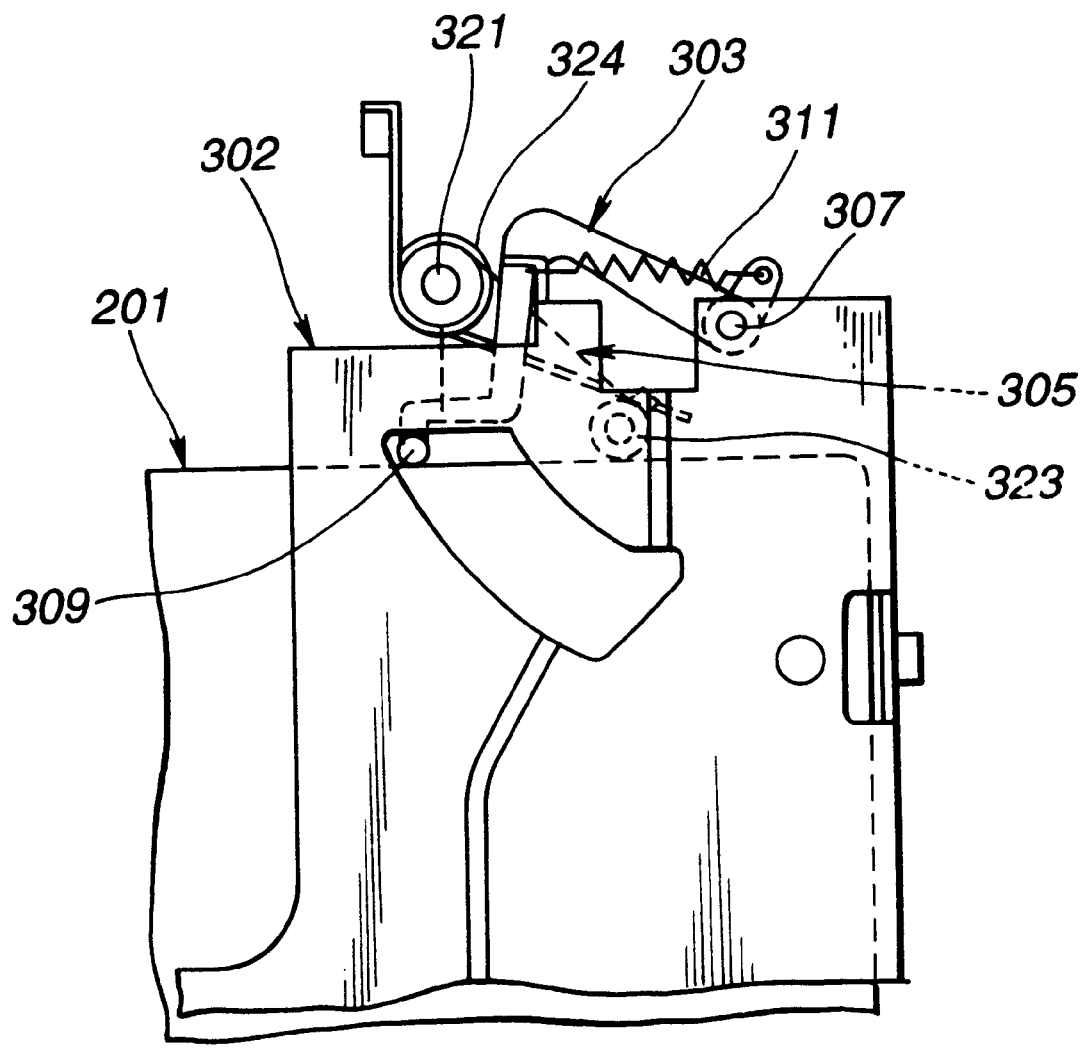
FIG. 54 is a view similar to FIG. 51, showing the known first recording-medium cartridge when being inproperly inserted in the known first drive.

Referring to FIGS. 2–3, the shell 3 of the second recording-medium cartridge 1 has in one side face 3a a portion 3b closed by the shutter 4 upon shutter closing as shown in FIG. 2, and facing outside upon shutter opening as shown in FIG. 3 by removing the shutter 4. The portion 3b is of the same height in its entirety without an equivalent of the concavity 211 of the first recording-medium cartridge 201 as shown in FIG. 45. The one side face 3a of the shell 3 having the portion 3b closed by the shutter 4 upon shutter closing and facing outside upon shutter opening corresponds to a front end face as viewed in a direction A of insertion in the drive.

The anti-misinsertion portion 11 is constructed by a groove 12 formed by a pair of first and second side walls 12a, 12b substantially perpendicular to the one side face 3a of the shell 3 and a connecting wall 12c for connecting the first and second side walls 12a, 12b, and a corner 13 arranged outside the first side wall 12a and at a corner of the one side face 3a.

The groove 12 is formed substantially like a rectangular parallelopiped extending from the one side face 3a of the snell 3 to another side face 3c thereof, and is arranged at a corner of the one side face 3a of the shell 3 as described above.

Figure 6:
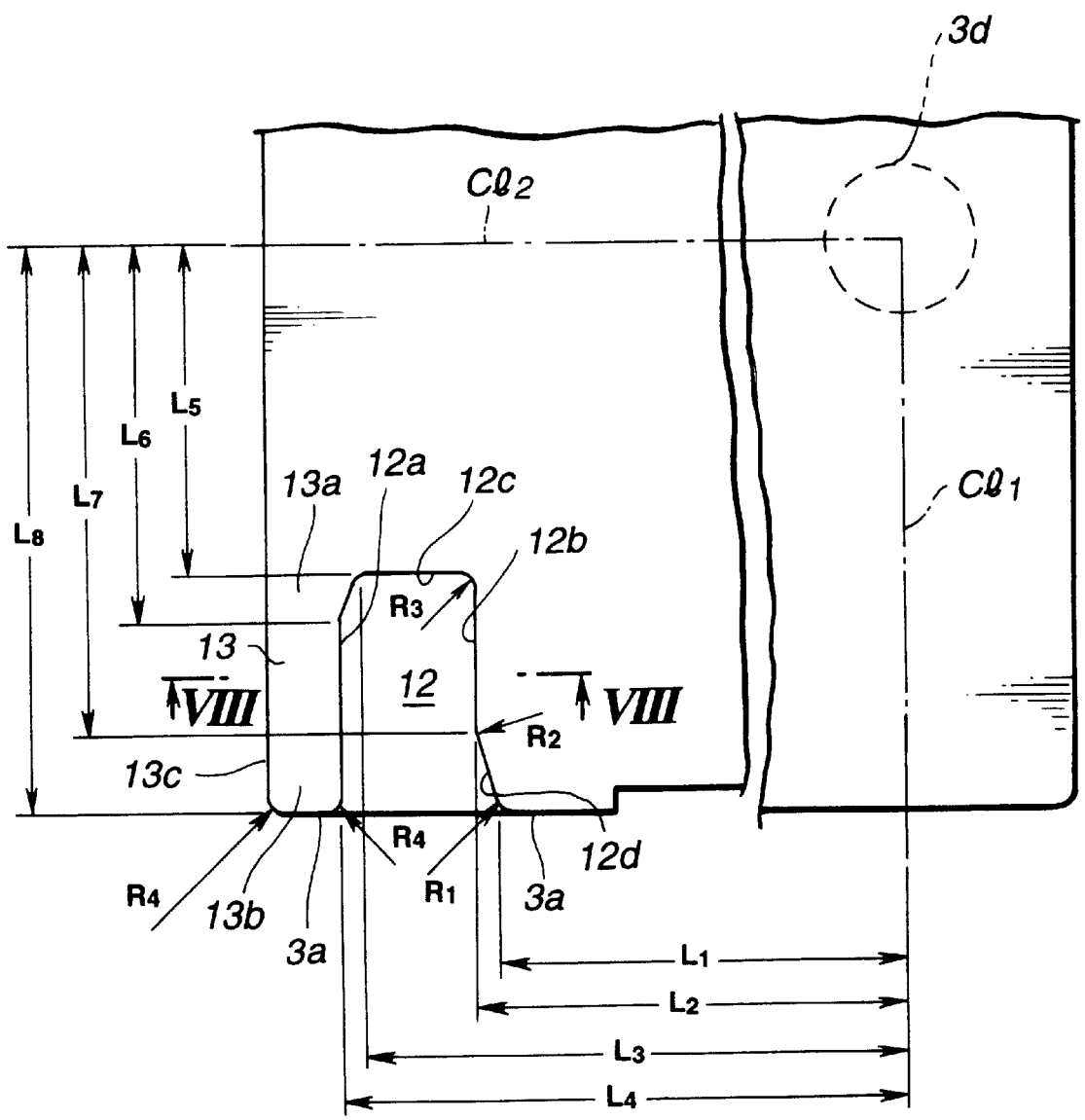
FIG. 6 is an enlarged fragmentary plan view showing the shell.

Referring to FIG. 6, the corner 13 has an end on the side of the connecting wall 12c, i.e. a base 13a, which is larger in width than an end on the side of the one side face 3a, i.e. a head 13b, to obtain reinforcement of the base 13a.

The second side wall 12b of the two side walls 12a, 12b constituting the groove 12, which is positioned opposite to the corner 13, has on the side of the one side face 3a an end chamfered to form an inclination 12d which enables easy and sure insertion of the anti-misinsertion portion 11 in the groove 12.

Referring to FIGS. 4–8, the size of the anti-misinsertion portion 11 is determined as follows. With respect to a first reference line $cl_1$ passing the center of a positioning reference hole 3d formed in the shell 3 and being perpendicular to the one side face 3a, a distance $L_1$ to an end of the inclination 12d on the side of the one side face 3a is 79.5±0.20 mm, a distance $L_2$ to an end of the inclination 12d on the side of the connecting wall 12c, i.e. the second side wall 12b, is 80.0±0.15 mm, a distance $L_3$ to an end of the base 13a on the side of the connecting wall 12c is 82.6±0.15 mm, and a distance $L_4$ to an end of the base 13a on the side of the one side face 3a, i.e. the first side wall 12a, is 83.1±0.15 mm.

Moreover, with respect to a second reference line $cl_2$ passing the center of the positioning reference hole 3d and being parallel to the one side face 3a, a distance $L_5$ to the connecting wall 12c of the groove 12 is 11.2±0.50 mm, a distance $L_6$ to an end of the base 13a on the side of the first side wall 12a is 12.5±0.20 mm, a distance $L_7$ to an end of the inclination 12d on the side of the connecting wall 12c is 15.5±0.25 mm, and a distance $L_8$ to the one side face 3a of the shell 3 is 17.5 ±0.20 mm.

A connection of the inclination 12d and the one side face 3a includes a circular face with a radius $R_1$ of 0.5±0.1 mm, and a connection of the inclination 12d and the second side wall 12b includes a circular face with a radius $R_2$ of 0.1±0.1 mm. Moreover, a connection of the second side wall 12b and the connecting wall 12c includes a circular face with a radius $R_3$ of 0.5±0.1 mm, and a connection of the first side wall 12a and the one side face 3a and a connection of an outer side face 13c of the corner 13 opposite to the first side wall 12a and the one side face 3a include a circular face with a radius $R_4$ of 0.5±0.1 mm.

Figure 7:
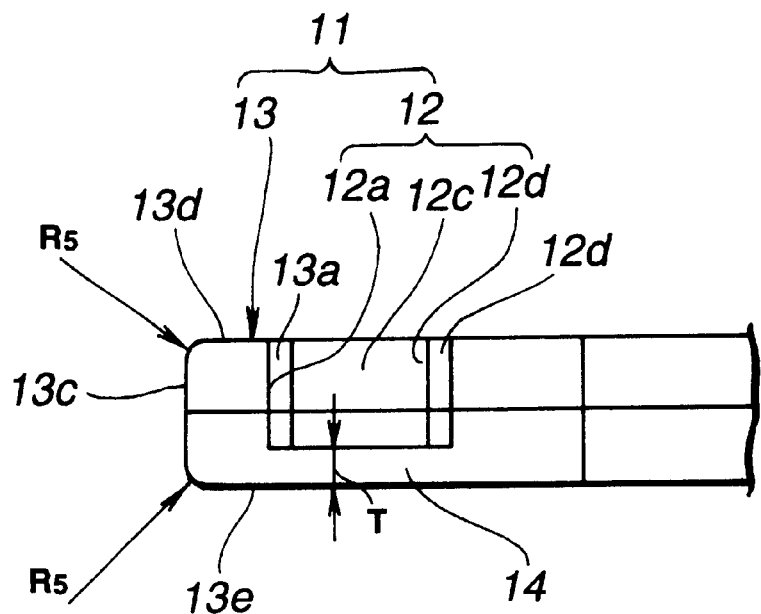
FIG. 7 is an enlarged fragmentary front view showing the shell.
Figure 8:
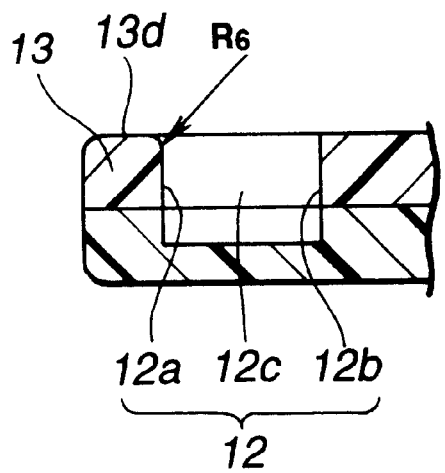
FIG. 8 is a sectional view taken along the line VIII—VIII in FIG. 6.

Referring to FIG. 7, a thickness T of a reinforcement 14 arranged on the bottom of the groove 12 is 0.8 mm in maximum. A connection of the outer side face 13c of the corner 13 and each of upper and lower sides 13d, 13e thereof includes a circular face with a radius $R_5$ of 0.5±0.1 mm. Referring to FIG. 8, a connection of the second side wall 12a of the groove 12 and the upper side 13d of the corner 13 includes a circular face with a radius $R_6$ of 0.2 mm or less.

Figure 9:
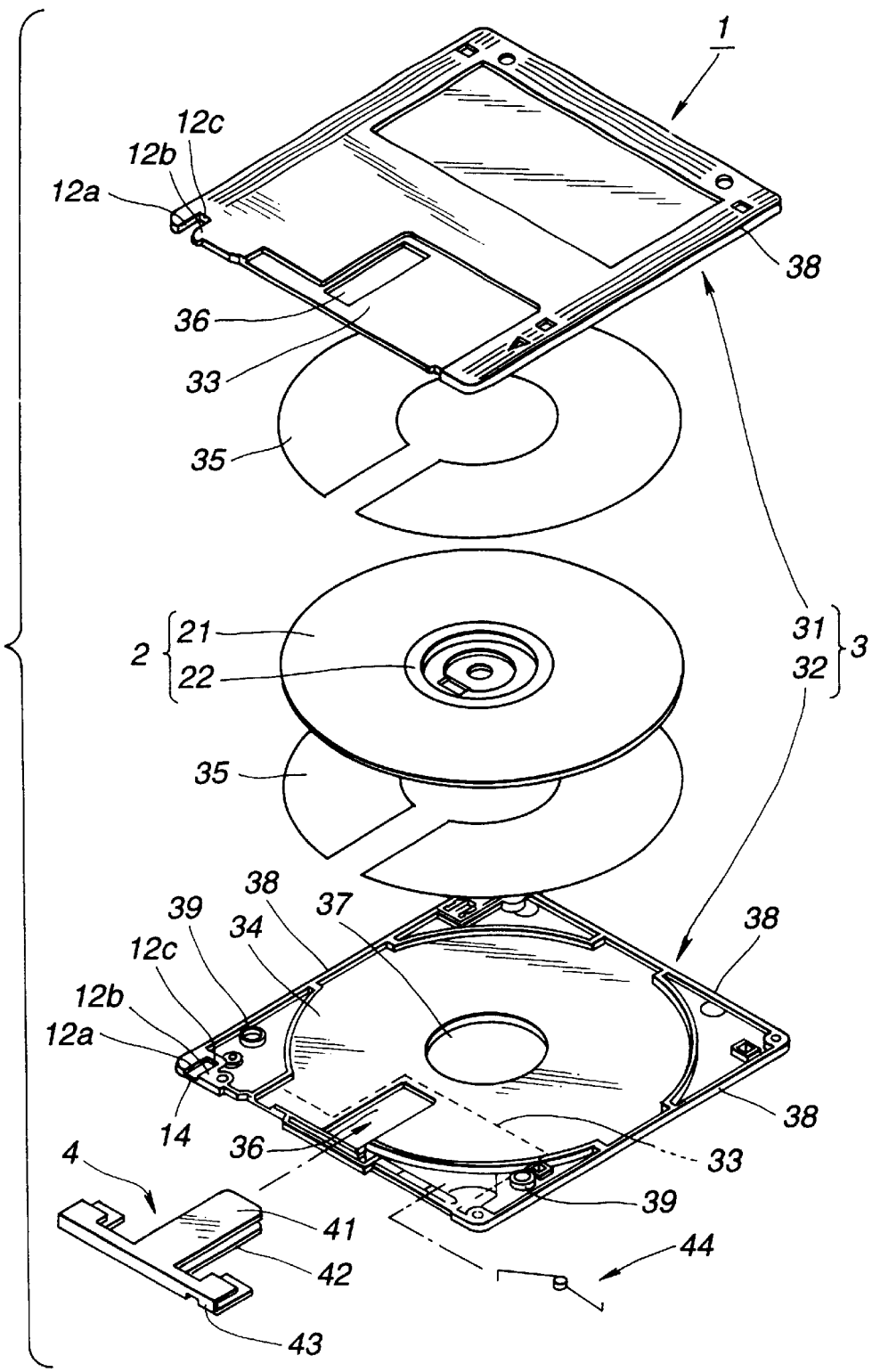
FIG. 9 is an exploded perspective view showing the second recording-medium cartridge.
Figure 10:
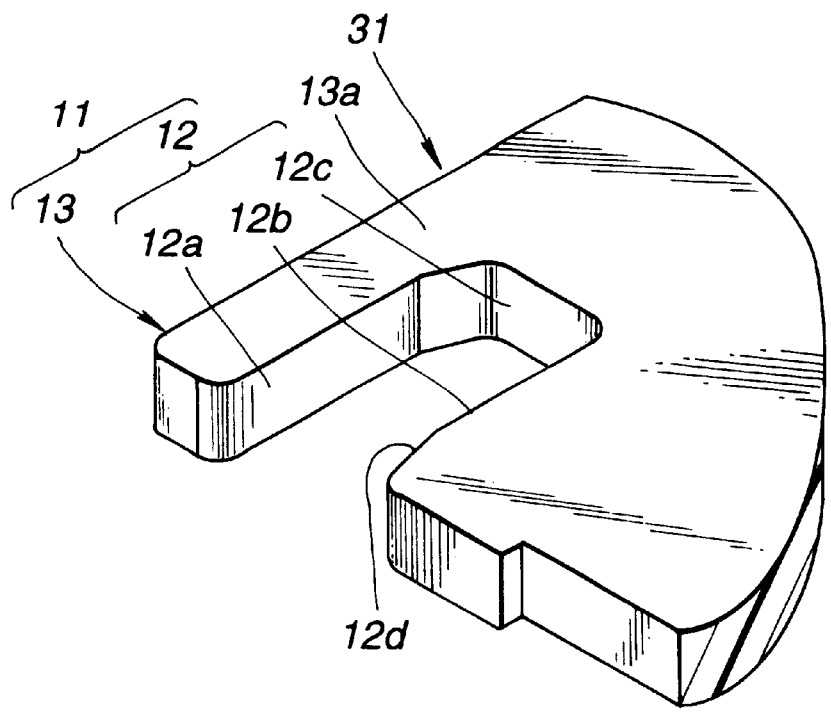
FIG. 10 is an enlarged fragmentary perspective view showing an upper half.
Figure 11:
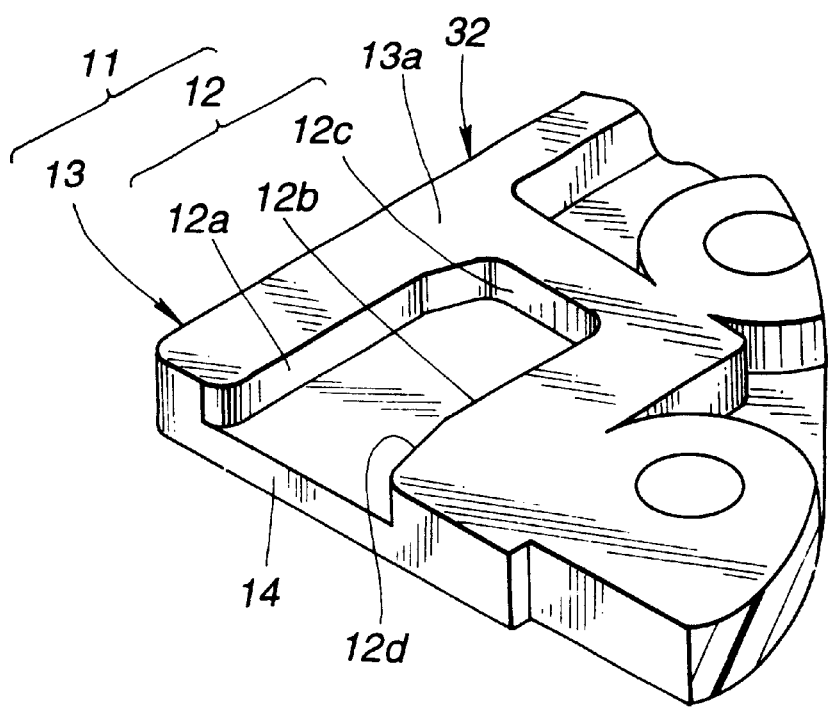
FIG. 11 is a view similar to FIG. 10, showing a lower half.

Referring to FIG. 9, the disc-like recording medium 2 includes a synthetic-resin sheet or magnetic sheet 21 having a signal recording layer, and a metallic center hub 22 arranged in the center thereof.

The shell 3 includes upper and lower halves 31, 32 made of a thermoplastic synthetic resin. Each of the upper and lower halves 31, 32 has a pair of side walls 12a, 12b and a connecting wall 12c which constitute the groove 12 of the anti-misinsertion portion 11. The side walls 12a, 12b and connecting wall 12c of the upper half 31 extend wholly in the direction of thickness of the shell 3, whereas the walls 12a, 12b and connecting wall 12c of the lower half 32 extend partly in the direction of thickness of the shell 3. The bottom of the side walls 12a, 12b and the connecting wall 12c is connected by a wall 14 for reinforcement.

Each of the upper and lower halves 31, 32 has a shutter slide area 33 on the outer side face at the front end face as viewed in the direction A of insertion in the drive, and a disc compartment 34 in the inner side face, the inner surface of which is provided with a liner 35.

The head opening 36 is formed in one side portion of the shutter slide area 33 of each of the upper and lower halves 31, 32. A spindle opening 37 is formed in the center of the disc compartment 34 of the lower half 32. When accommodating the disc-like recording medium 2 in the disc compartment 34, the center hub 22 faces the spindle opening 37, whereas the signal recording layer of the synthetic-resin sheet 21 faces the head opening 36.

The shell 3 is formed like a flat rectangular box by peripheral walls 38 and ribs 39 of the upper and lower halves 31, 32 arranged opposite to each other and welded ultrasonically.

The shutter 4 is formed like C by upper and lower plates 41, 42 placed on the outer surfaces of the upper and lower halves 31, 32, and a connecting plate 43 for connecting ends of the upper and lower plates 41, 42. The shutter 4 is slidably arranged in the shutter slide areas 33 with the upper and lower halves 31, 32 of the shell 3 held by the upper and lower plates 41, 42.

The shutter 4 biased by a torsion coil spring 44 is pressed to one side of the shutter slide area 33 to close the head openings 36 of the upper and lower halves 31, 32 of the shell 3 by the upper and lower plates 41, 42.

Figure 12:
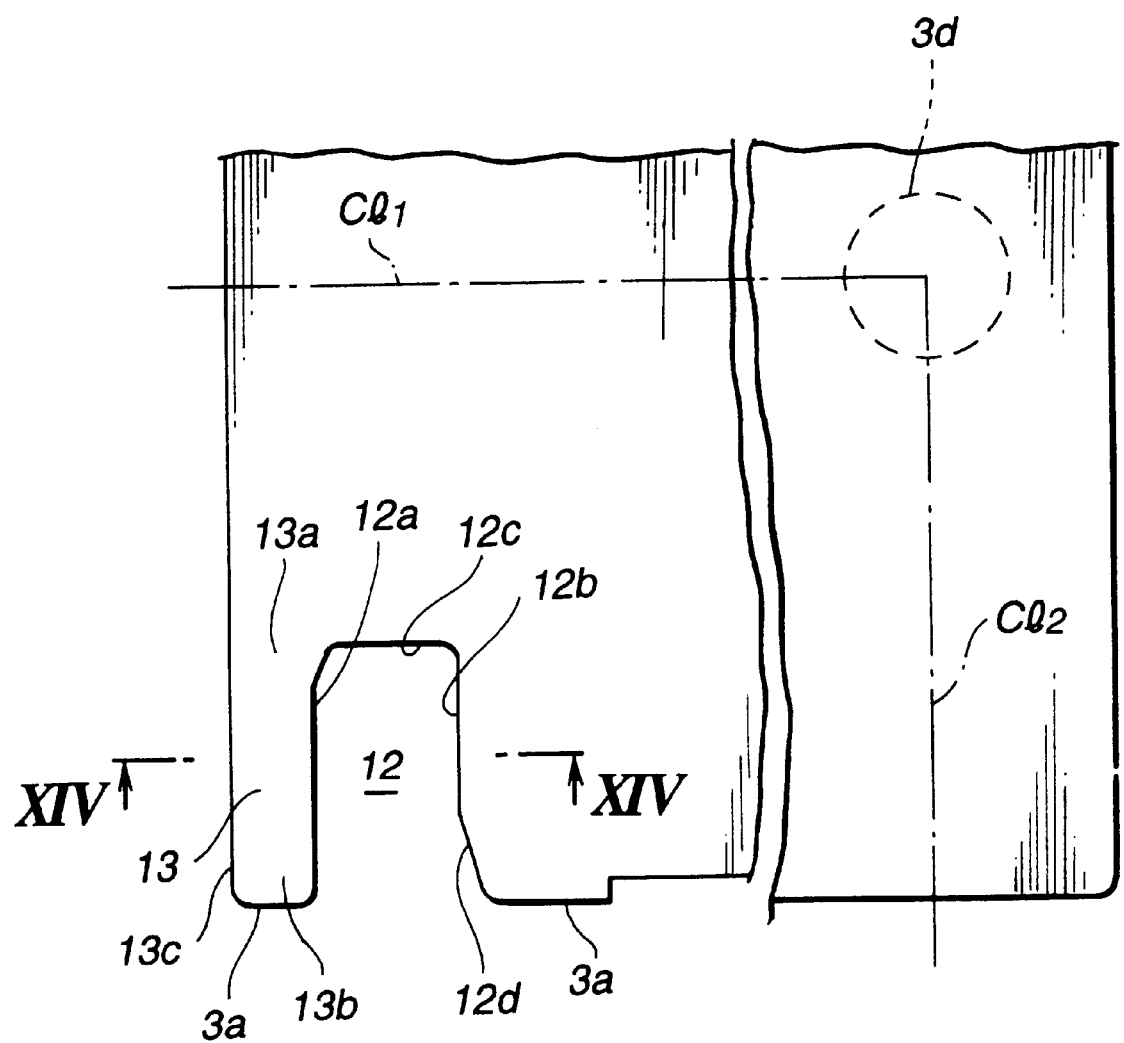
FIG. 12 is a view similar to FIG. 6, showing a first variant of an anti-misinsertion portion.
Figure 13:
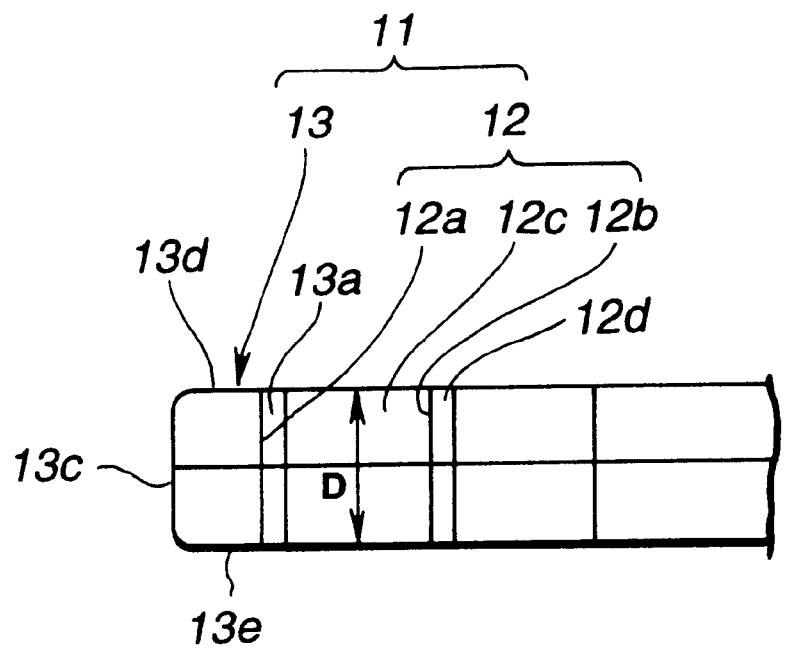
FIG. 13 is a view similar to FIG. 7, showing the first variant of an anti-misinsertion portion.
Figure 14:
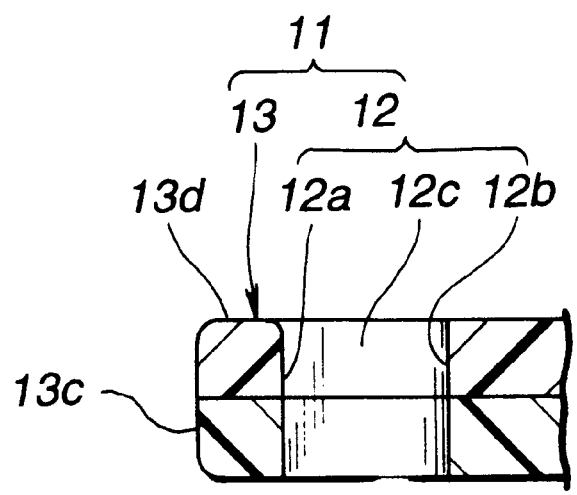
FIG. 14 is a view similar to FIG. 8, taken along the line XIV—XIV in FIG. 12.
Figure 21:
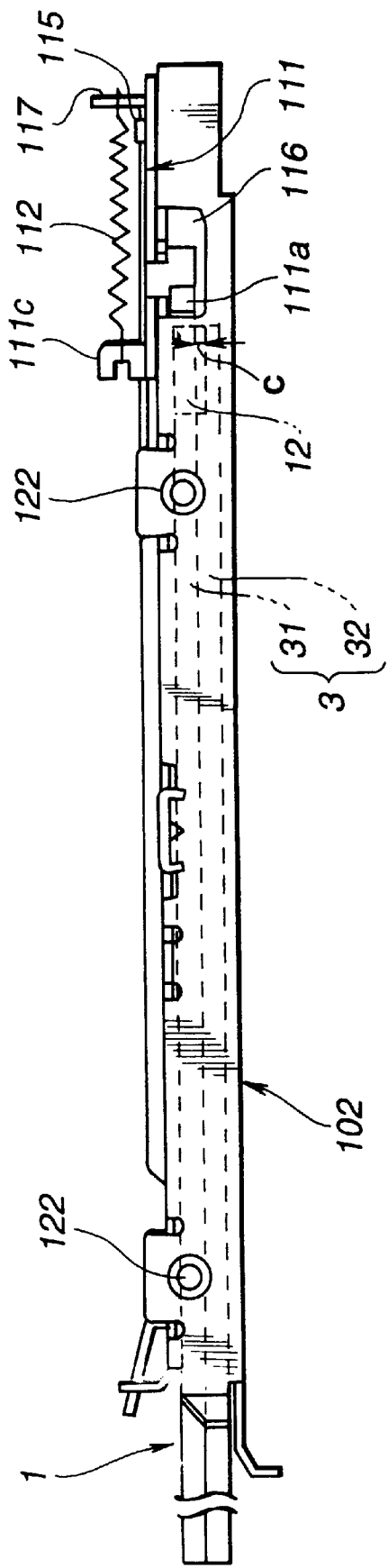
FIG. 21 is a side view showing a cartridge holder.

FIGS. 12–14 show a first variant of the anti-misinsertion portion 11. In this variant, the side walls 12a, 12b and connecting wall 12c which constitute the groove 12 of the anti-misinsertion portion 11 extend wholly in the direction of thickness of the upper and lower halves 31, 32. Therefore, a depth D of the groove 12 is increased to enlarge a clearance C (see FIG. 21) between the groove 12 and the lower end of the anti-misinsertion member 111 inserted therein, obtaining smooth sliding of the anti-misinsertion member 111 in the groove 12.

Figure 15:
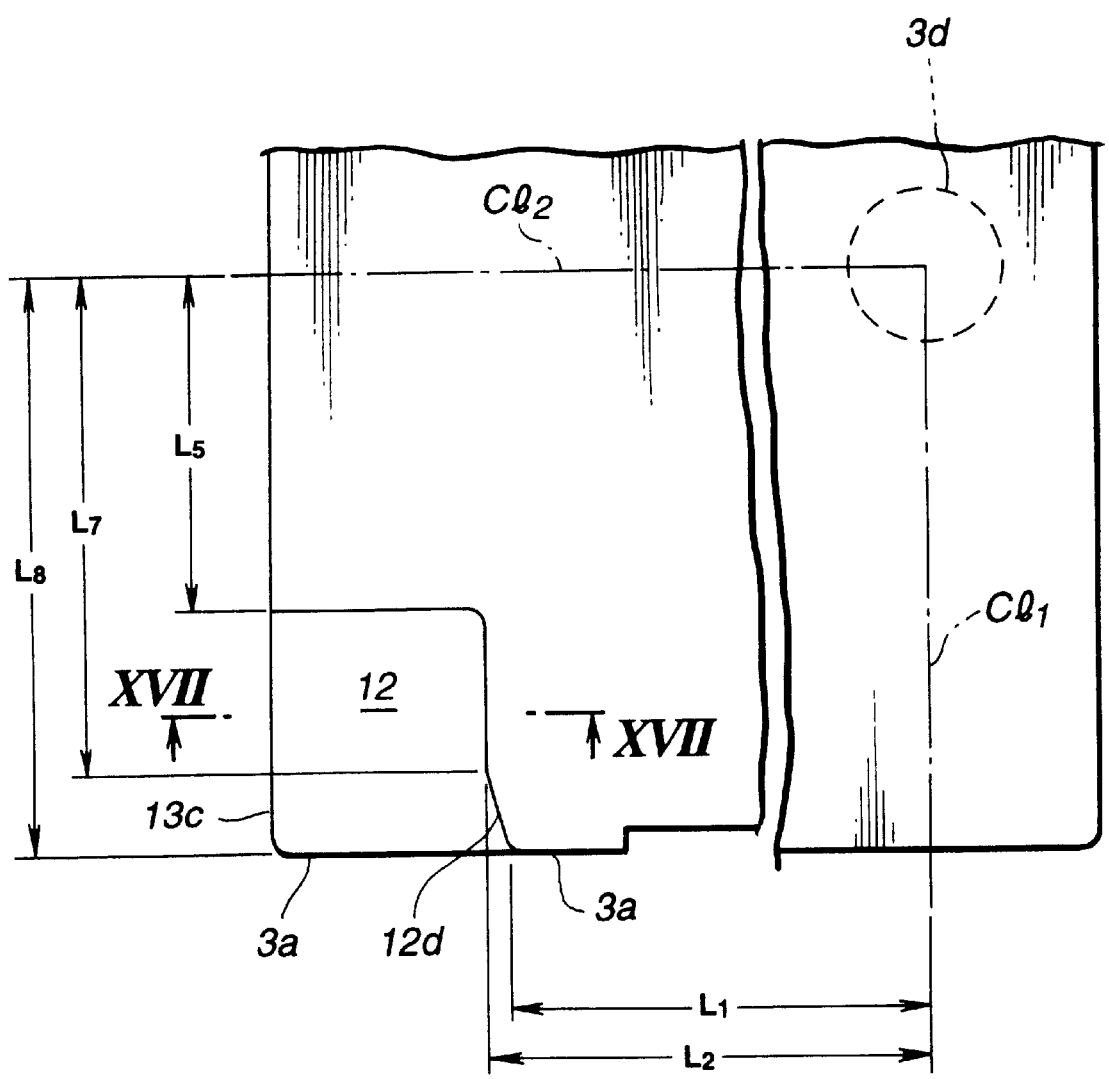
FIG. 15 is a view similar to FIG. 12, showing a second variant of an anti-misinsertion portion.
Figure 16:
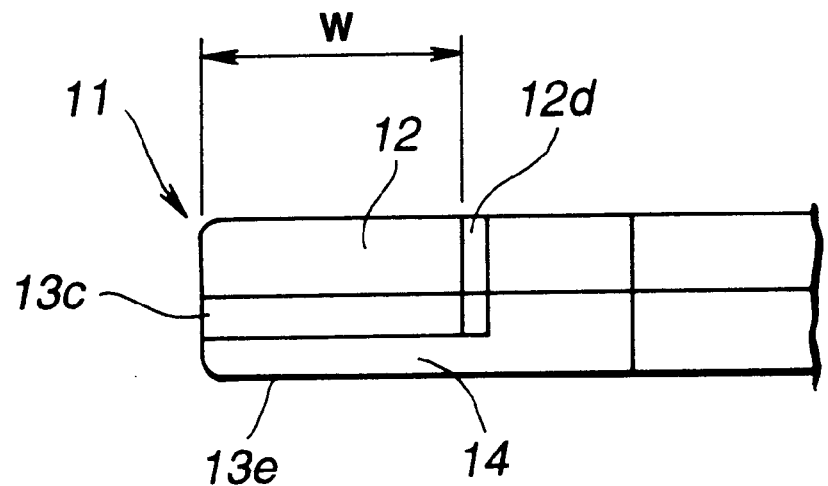
FIG. 16 is a view similar to FIG. 13, showing the second variant of an anti-misinsertion portion.
Figure 17:
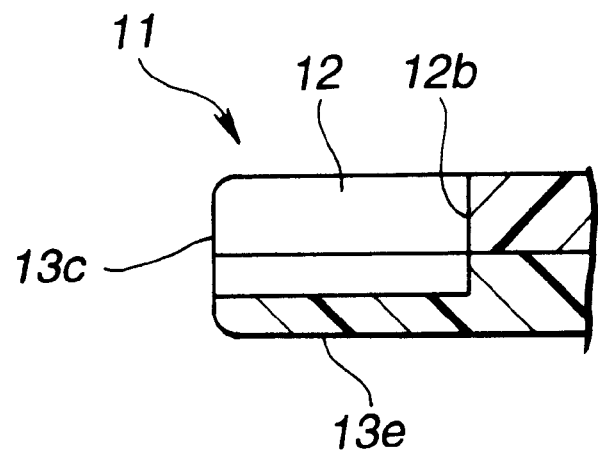
FIG. 17 is a view similar to FIG. 14, taken along the line XVII—XVII in FIG. 15.

FIGS. 15–17 show a second variant of the anti-misinsertion portion 11. In this variant, the anti-misinsertion portion 11 has no corner 13. Therefore, a width W of the groove 12 is increased to obtain easy and sure introduction of the anti-misinsertion member 11 in the groove 12.

Figure 18:
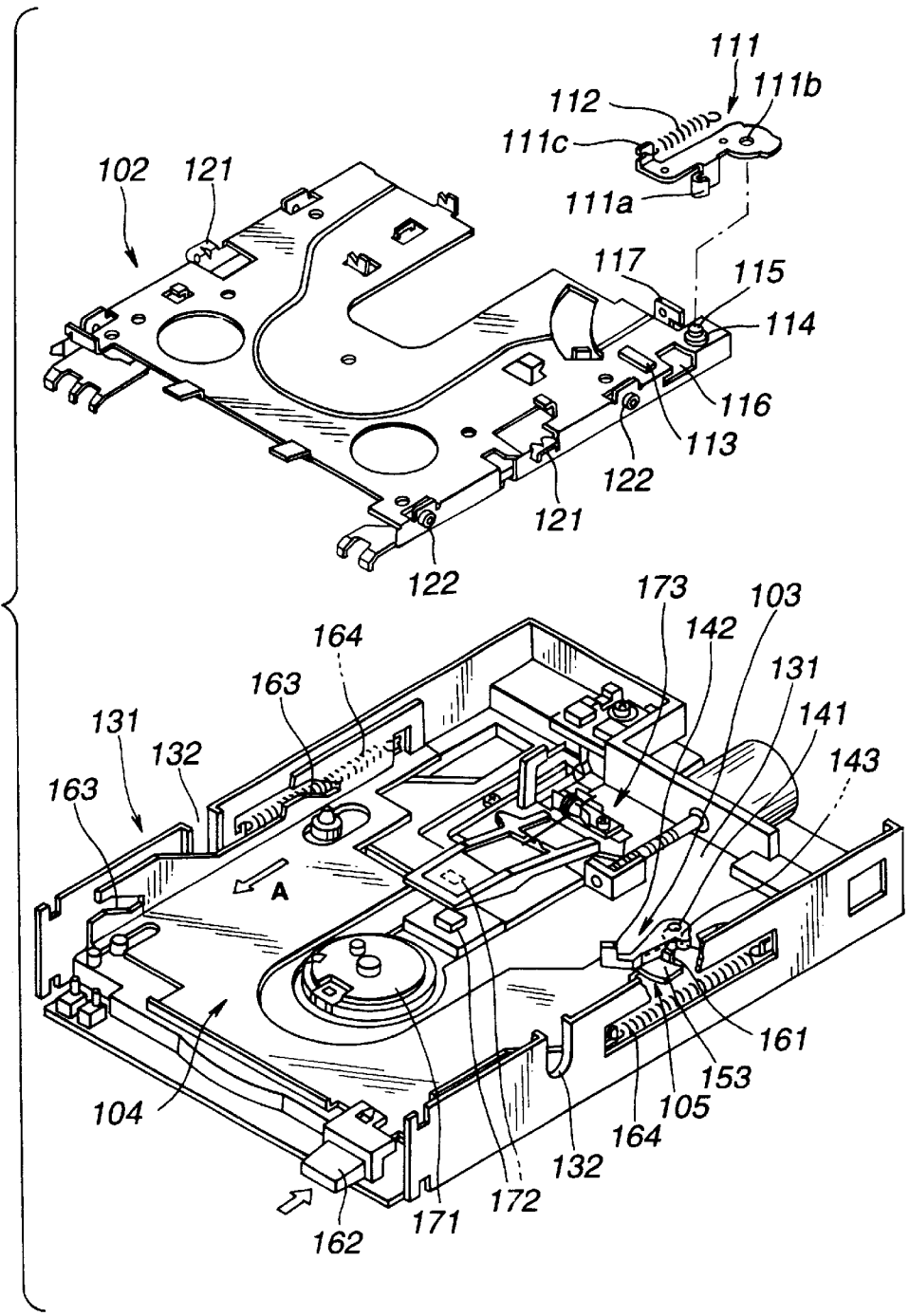
FIG. 18 is a view similar to FIG. 9, showing the second drive.
Figure 19:
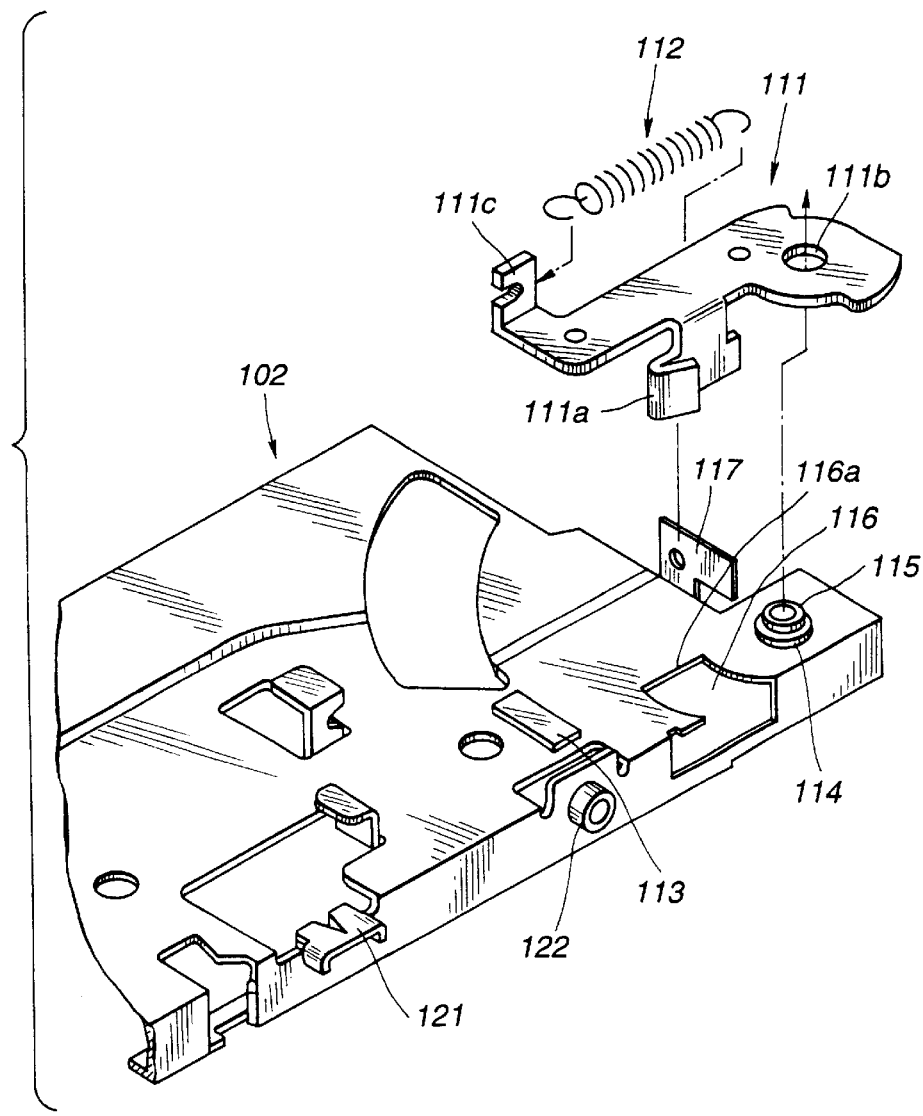
FIG. 19 is a view similar to FIG. 10, showing the second drive.

With the second drive 101, referring to FIG. 18, the cartridge holder 102 is vertically movably mounted to the chassis 131 by inserting guide protrusions 121 arranged on both sides of the cartridge holder 102 in guide grooves 132 formed in the chassis 131. The cartridge holder 102 receives a downward force from a spring, not shown. Cylindrical protrusions 122 are arranged with the cartridge holder 102 on both side faces thereof, and are mounted on inclined faces 163 of the lifting member 104 as will be described later.

The shutter opening member 103 has one end rotatably mounted to the chassis 131 by a shaft 141, and another end or free end formed with a shutter engaging protrusion 142. The shutter engaging protrusion 142 is larger in size than the concavity 211 formed in the front end face of the first recording-medium cartridge 201 to prevent engagement therewith.

The shutter opening member 103, which receives a torque from a torsion coil spring 143, is set in a position that the shutter engaging protrusion 142 is introduced in a groove 3e of the recording-medium cartridge inserted in the cartridge holder 102.

The lifting member 104 is slidably mounted to the upper side of the chassis 131. The lifting member 104 has as viewed in the slide direction one end formed with an engaged or locked portion 161 engaged with an engagement or lock 153 of the trigger member 105 as will be described later, and another end formed with an eject lever 162. Moreover, the lifting member 104 has inclined legs 163 on both sides thereof in the direction perpendicular to the slide direction and in positions corresponding to the cylindrical protrusions 122 arranged on both sides of the cartridge holder 102. The inclined legs 163 serve to move upward and downward the cylindrical protrusions 122 or the cartridge holder 102.

The lifting member 104 receives slide forces from coil springs 164, 164 in the direction of moving downward the cartridge holder 102, i.e. in the direction that a lower end of the inclined leg 163 corresponds to the cylindrical protrusion 122 or the direction of an arrow A as shown in FIG. 18. When pressing the eject lever 162 to slide the lifting member 104 against Lorces of the coil springs 164, the inclined legs 163 move upward the cartridge holder 102 to an insertion position.

The trigger member 105 is integrated with the shutter opening member 104. The trigger member 105 is formed substantially circularly about the shaft 141 of the shutter opening member 104, and has on an inner peripheral surface an engagement 153 engaged with the engaged portion 161 of the lifting member 104. With the trigger member 105, as described above, when pressing the eject lever 162 to slide the lifting member 104 against forces of the coil springs 164 so as to move upward the cartridge holder 102 to the insertion position, the engagement 153 is engaged with the engaged portion 161 of the lifting member 104 to lock the lifting member 104 with the cartridge holder 102 located in the insertion position. And when inserting the recording-medium cartridge in the cartridge holder 102 to press the shutter engaging protrusion 142 by the front end face so as to rotate the shutter opening member 103 against a force of the torsion coil spring 143 for opening the shutter 4, engagement of the engagement 153 of the trigger member 105 with the engaged portion 161 is released to remove lock for the lifting member 104.

The anti-misinsertion member 111 is mounted on the upper side of the cartridge holder 102 at one end of the innermost portion as viewed in the direction of insertion in the cartridge holder 102. The anti-misinsertion member 111 includes a metal plate subjected to press working, and has a center formed with a protrusion 111a which is entered in the cartridge holder 102, one end formed with a bearing hole 111b, and another end formed with a spring engagement 111c.

Disposed on support protrusions 113, 114 arranged on the upper side of the cartridge holder 102 with a shaft 115 arranged on the upper side of the cartridge holder 102 being inserted in the bearing hole 111b, the anti-misinsertion member 111 is mounted on the upper side of the cartridge holder 102 to be rotatable about the shaft 115. The protrusion 111a includes one side of the anti-misinsertion member 111 extending downward and having an end bent substantially like V. The protrusion 111a is entered in the cartridge holder 102 through a recess 116 formed therein. The spring engagement 111c includes another side of the anti-misinsertion member 111 extending upward.

Figure 20:
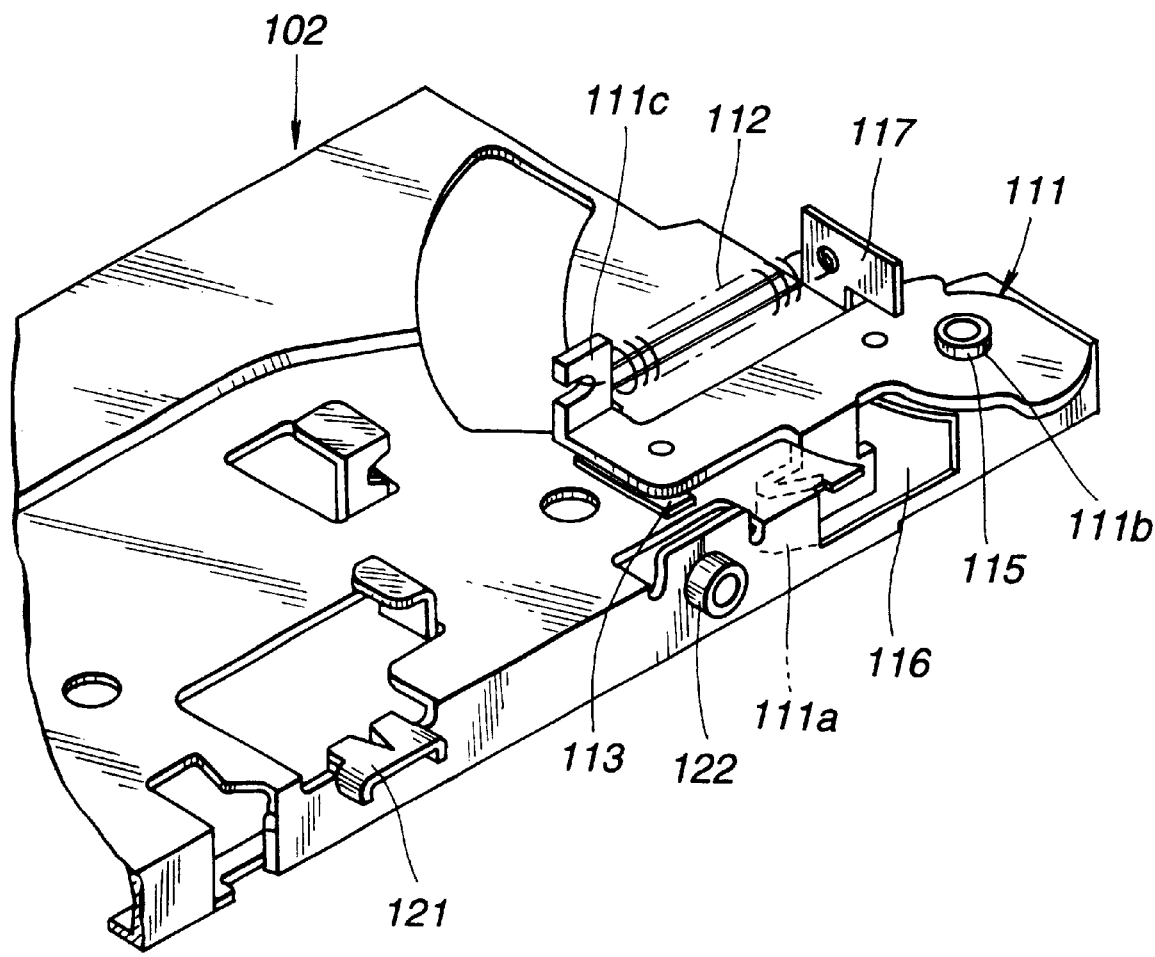
FIG. 20 is a view similar to FIG. 19, showing the second drive with an anti-misinsertion member and a coil spring mounted.

The coil spring 112 for providing a torque to the anti-misinsertion member 111 has one end engaged with the spring engagement 111c of the anti-misinsertion member 111, and another end engaged with a spring engagement 117 arranged at an end of the cartridge holder 102. The coil spring 112 provides to the anti-misinsertion member 111 a torque in the first direction as viewed in FIG. 20 or clockwise torque about the shaft 115.

The anti-misinsertion member 111, which receives from the coil spring 112 a torque in the first direction, contacts one end 116a of the recess 116 of the cartridge holder 102 so as not to rotate further. In that state, when inserting in the cartridge holder 102 of the second drive 101 the second recording-medium cartridge 1 in a normal position, the protrusion 111a of the anti-misinsertion member 111 is entered in the groove 12 of the anti-misinsertion portion 11 of the second recording-medium cartridge 1. When inserting the first recording-medium cartridge 201 in a normal position, the protrusion 111a of the anti-misinsertion member 111 contacts the inclination 203e of the first recording-medium cartridge 201. Note that in FIG. 18, 171 designates a spindle, 172 designates a magnetic head, and 173 designates a head carriage.

Next, operation of the second recording-medium cartridge 1 and the second drive 101 will be described.

1) When inserting the second recording-medium cartridge 1 in the second drive 101:

A) Upon insertion in a normal position

Figure 22:
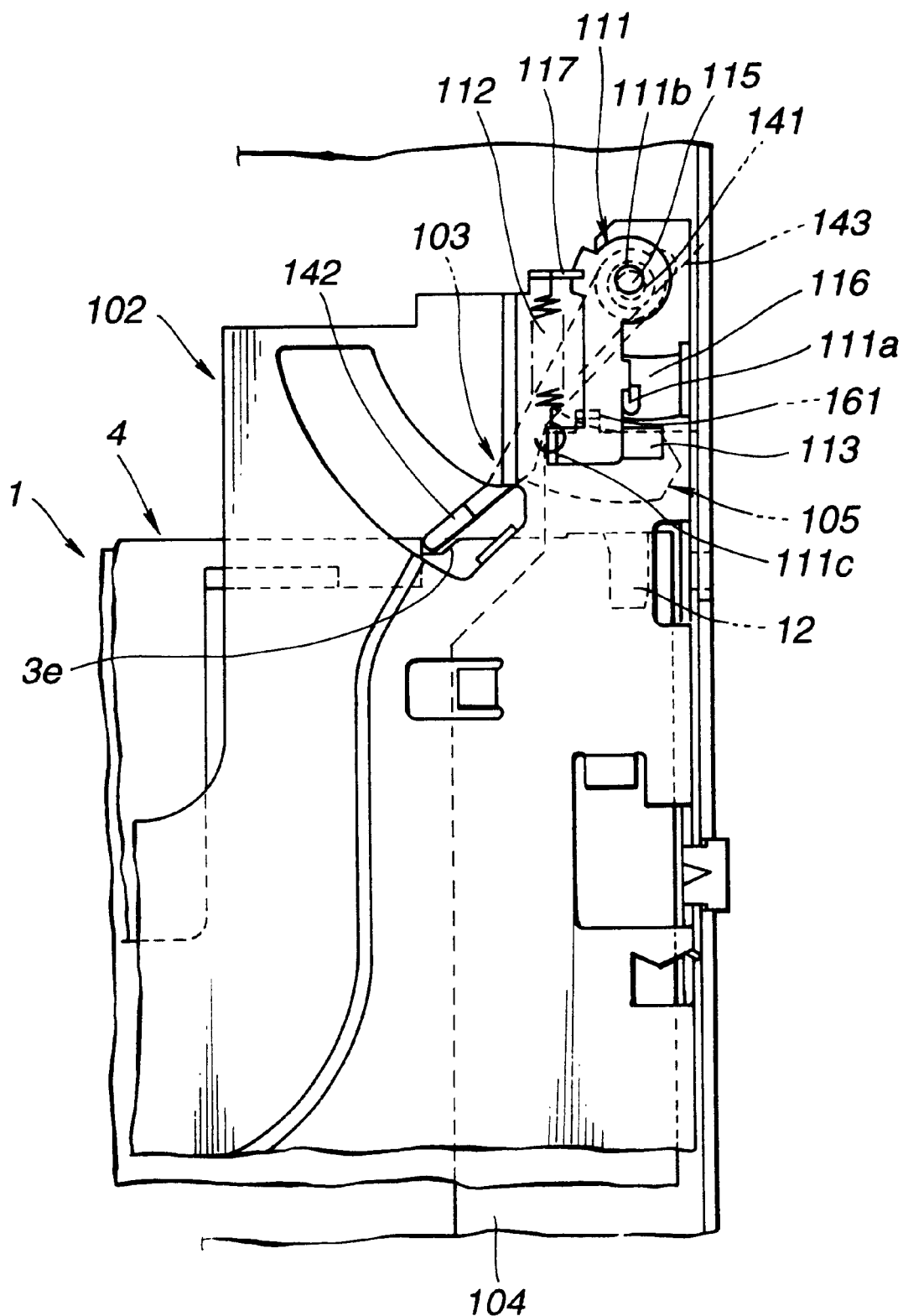
FIG. 22 is a view similar to FIG. 15, showing the second recording-medium cartridge when being properly inserted in the second drive.
Figure 23:
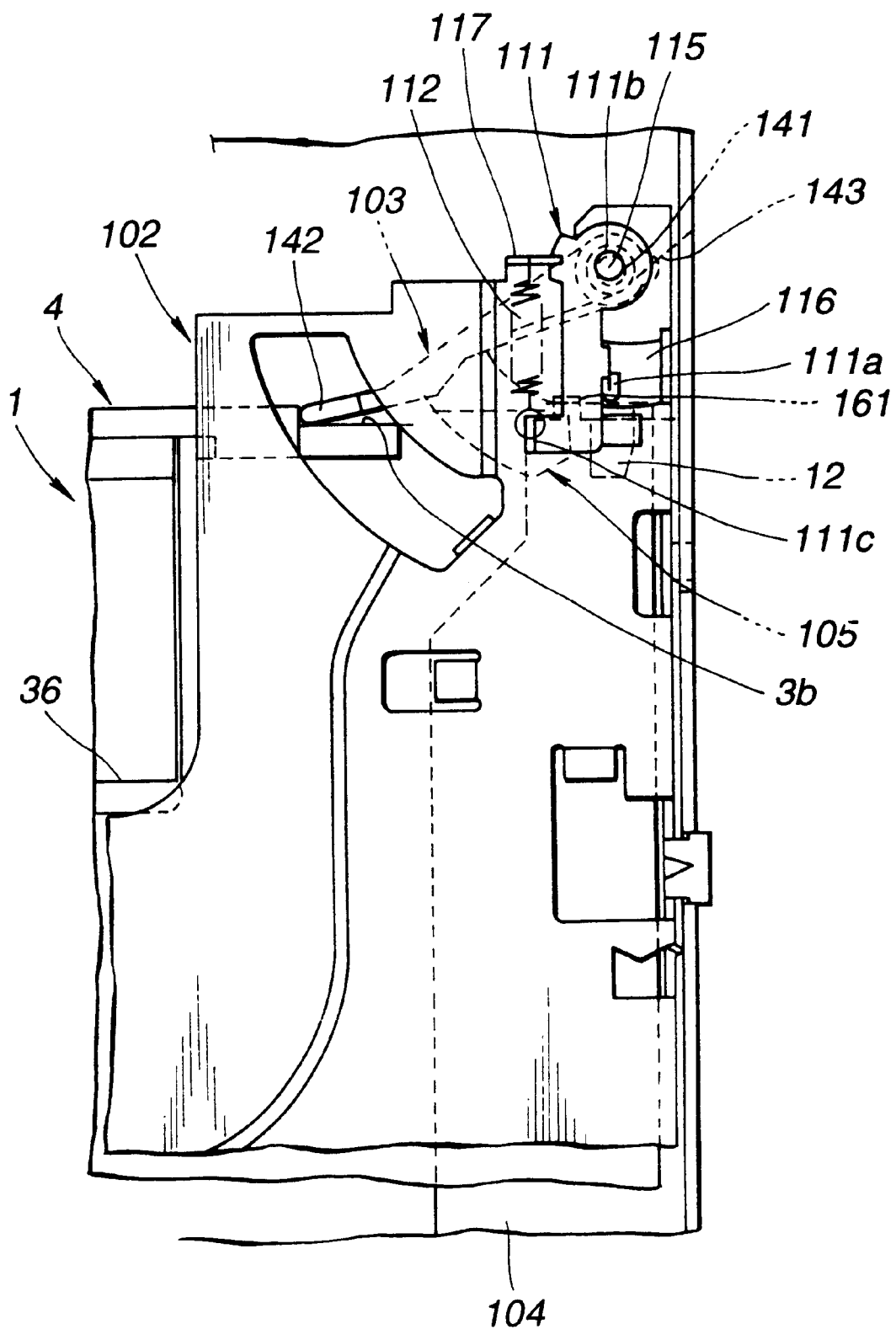
FIG. 23 is a view similar to FIG. 22, showing the second recording-medium cartridge when being properly inserted in the second drive.
Figure 24:
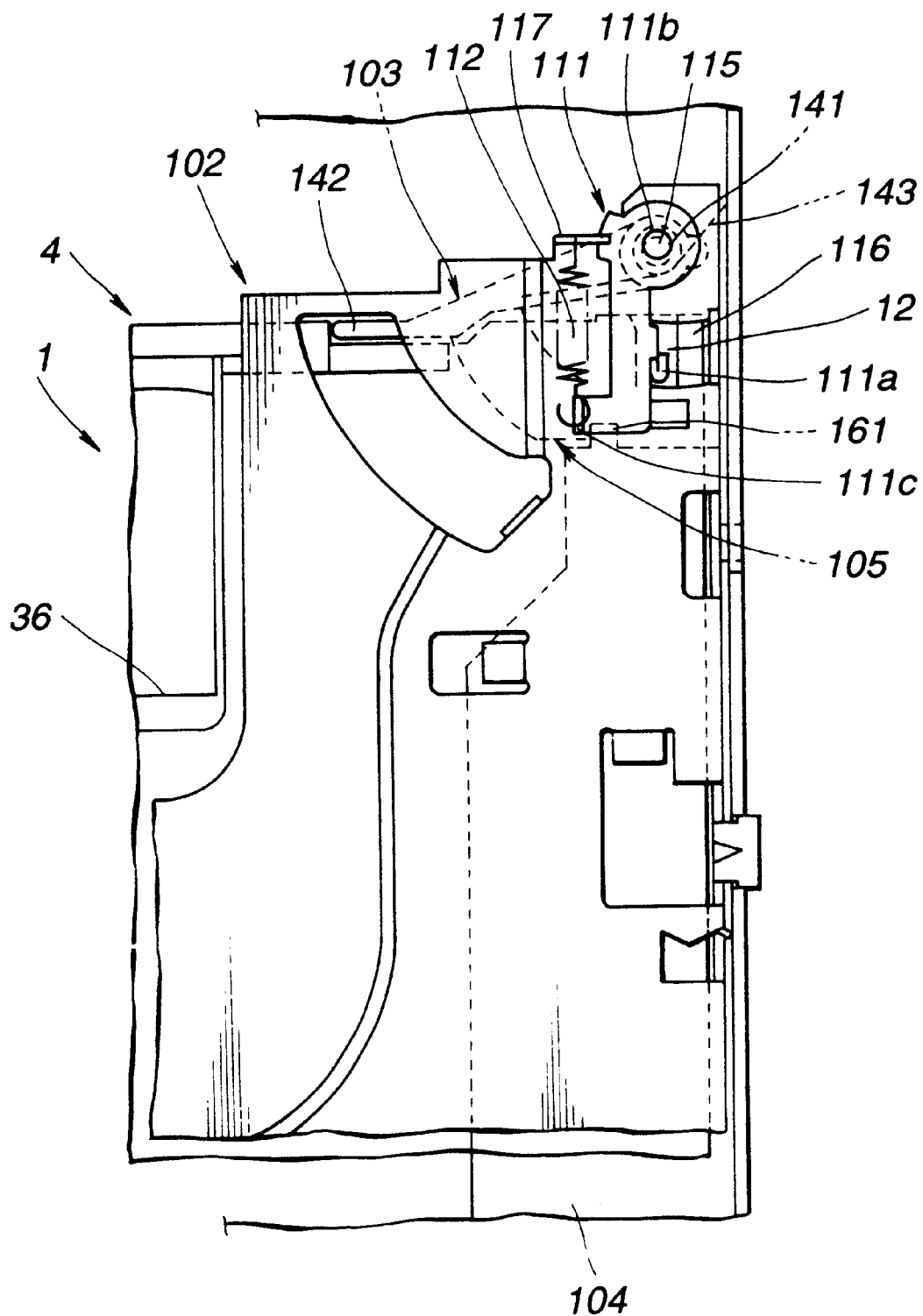
FIG. 24 is a view similar to FIG. 23, showing the second recording-medium cartridge when being properly inserted in the second drive.

Referring to FIGS. 22–24, when inserting the second recording-medium cartridge 1 in the cartridge holder 102 of the second drive 101, the shutter engaging protrusion 142 of the shutter opening member 103 is introduced in the groove 3e formed in the front end face of the second recording-medium cartridge 1. Thus, the shutter opening member 103 is rotated against a force of the torsion coil spring 143 to open the shutter 4 of the second recording-medium cartridge 1 by the shutter engaging protrusion 142.

Figure 25:
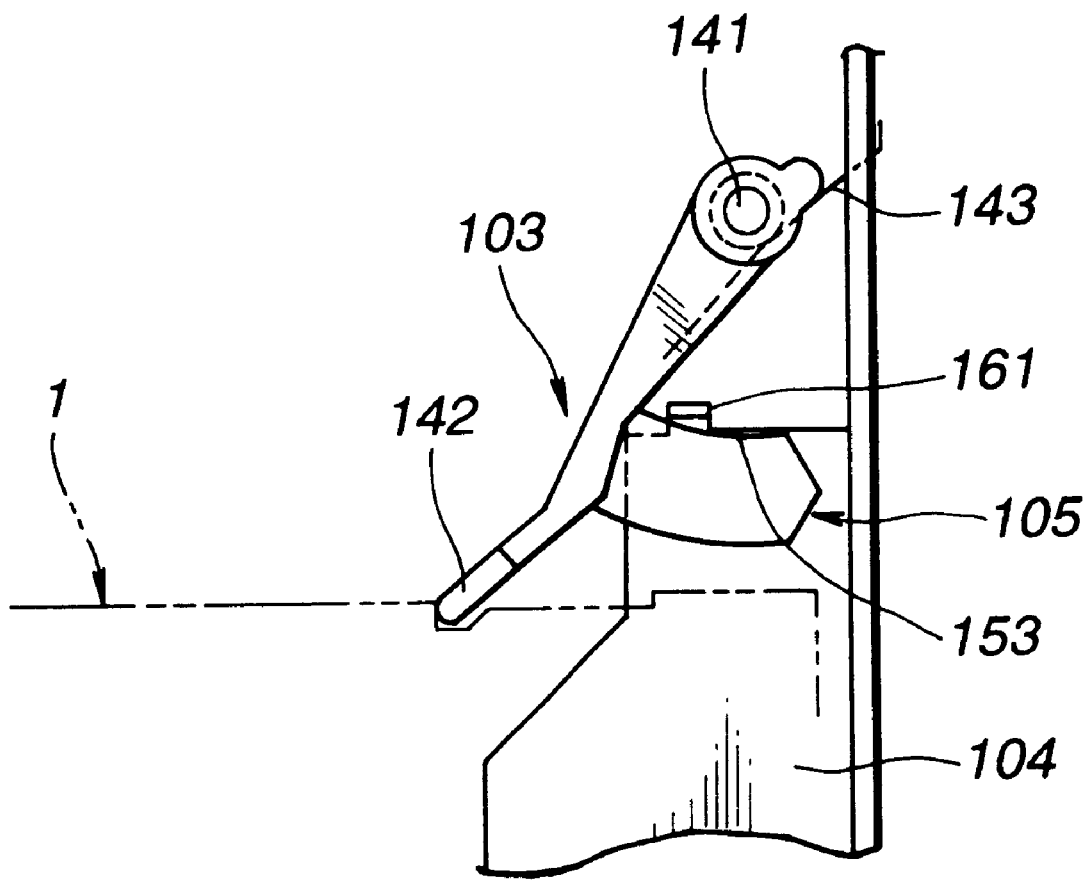
FIG. 25 is a view similar to FIG. 4, showing a trigger member.
Figure 26:
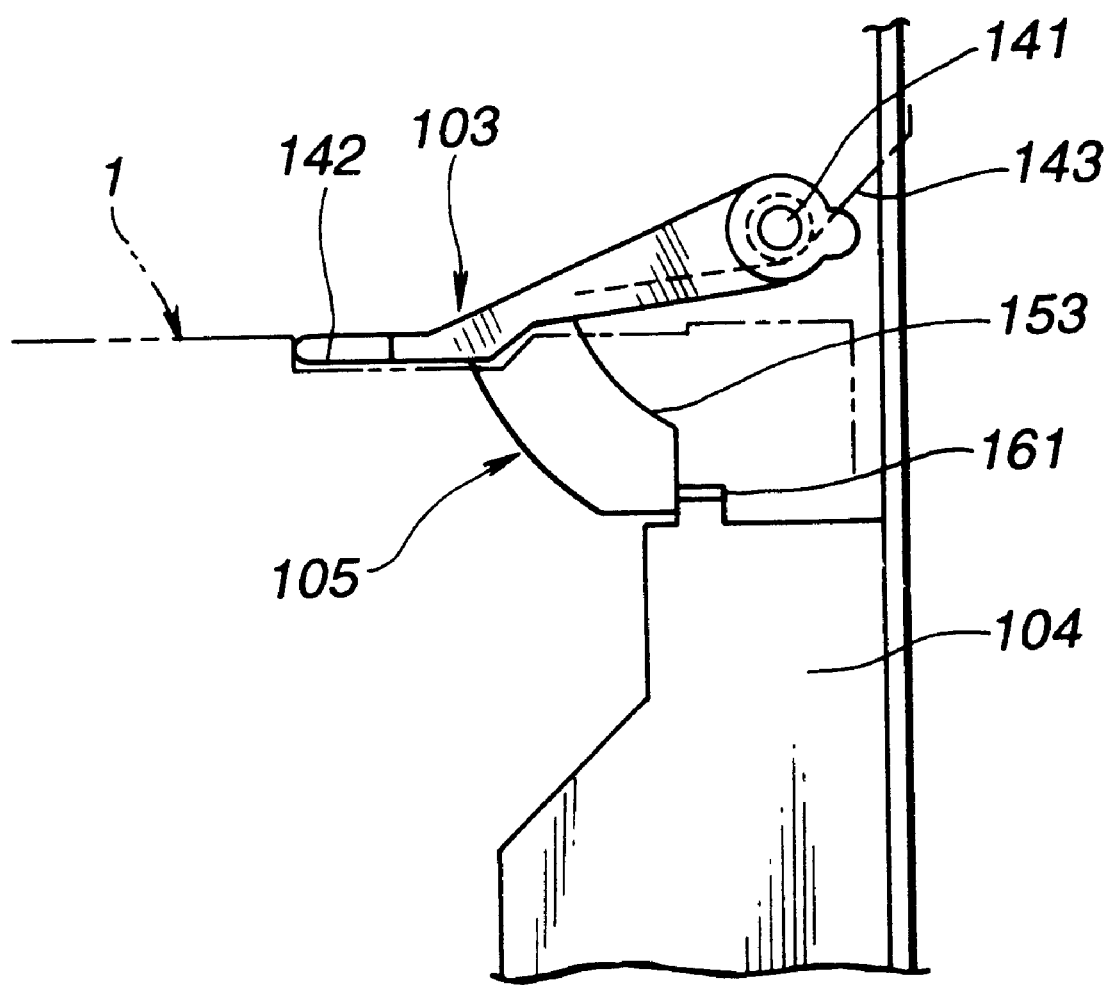
FIG. 26 is a view similar to FIG. 25, showing the trigger member.

When inserting further the second recording-medium cartridge 1 in the cartridge holder 102, the protrusion 111a of the anti-misinsertion member 111 of the cartridge holder 102 is entered in the groove 12 of the anti-misinsertion portion 11 of the second recording-medium cartridge 1. Referring to FIGS. 25–26, when the protrusion 111a comes at the innermost portion of the groove 12, the shutter 4 is opened by the shutter opening member 103. At the same time, engagement of the engagement 153 of the trigger member 105 with the engaged portion 161 of the lifting member 104 is released to remove lock of the lifting member 104 by the trigger member 105. Thus, the lifting member 104 is slid by forces of the coil springs 164 to move downward the cartridge holder 102, disposing the center hub 22 of the second recording-medium cartridge 1 on the spindle 171 of the second drive 101.

B) Upon misinsertion such as upside-down insertion or reverse insertion

Figure 27:
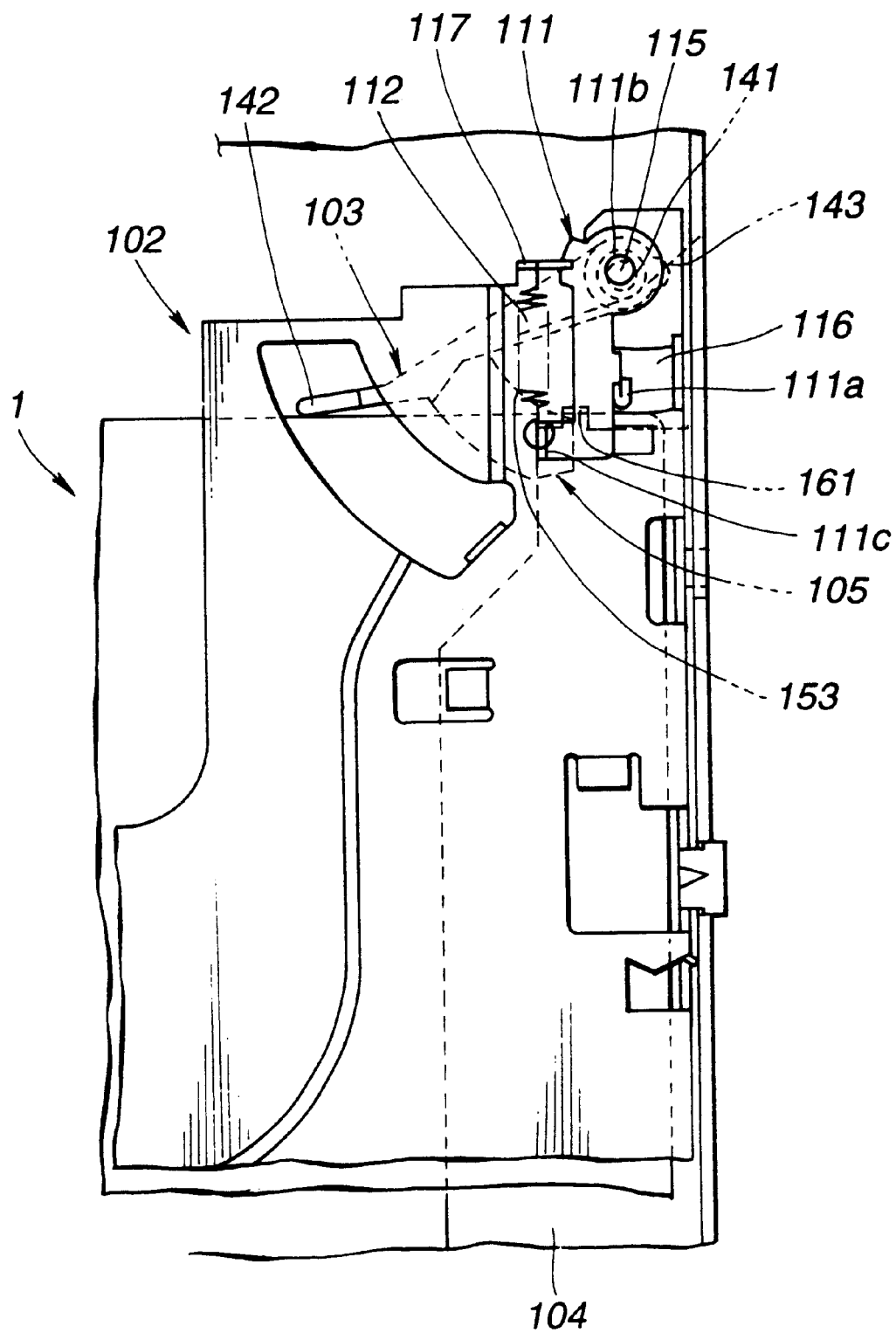
FIG. 27 is a view similar to FIG. 24, showing the second recording-medium cartridge when being improperly inserted in the second drive.

Referring to FIG. 27, when improperly inserting the second recording-medium cartridge 1 in the cartridge holder 102, a portion of the end face of the second recording-medium cartridge 1 other than the groove 12 contacts the head of the protrusion 111a of the anti-misinsertion portion 11, preventing further insertion of the second recording-medium cartridge 1.

2) When inserting the second recording-medium cartridge 1 in the first drive 301:

A) Upon insertion in a normal position

Figure 28:
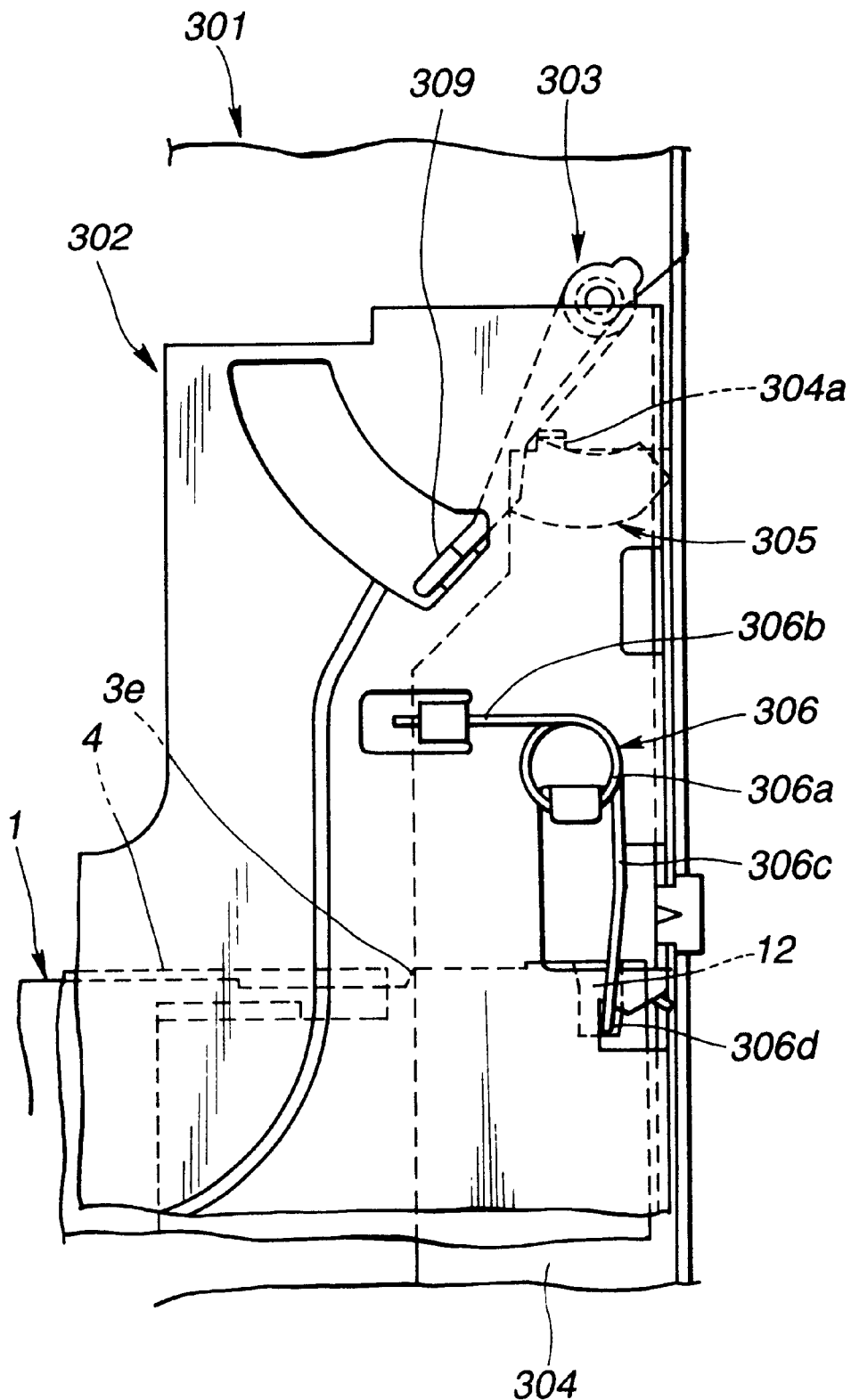
FIG. 28 is a view similar to FIG. 27, showing the second recording-medium cartridge when being properly inserted in a first drive of an integrated trigger type.

Referring to FIG. 28, when inserting the second recording-medium in the cartridge holder 302 of the first drive 301, the second arm 306c of the anti-misinsertion member 306 in the form of a torsion coil spring arranged with the first drive 301 is introduced in the groove 12 of the anti-misinsertion portion 11 of the second recording-medium cartridge 1. Due to the first and second side walls 12a, 12b of the groove 12, the second arm 306c introduced in the groove 12 cannot turn to the outside of the second recording-medium cartridge 1, and becomes in the stretched state to prevent further insertion of the second recording-medium cartridge 1 in the cartridge holder 302.

Figure 29:
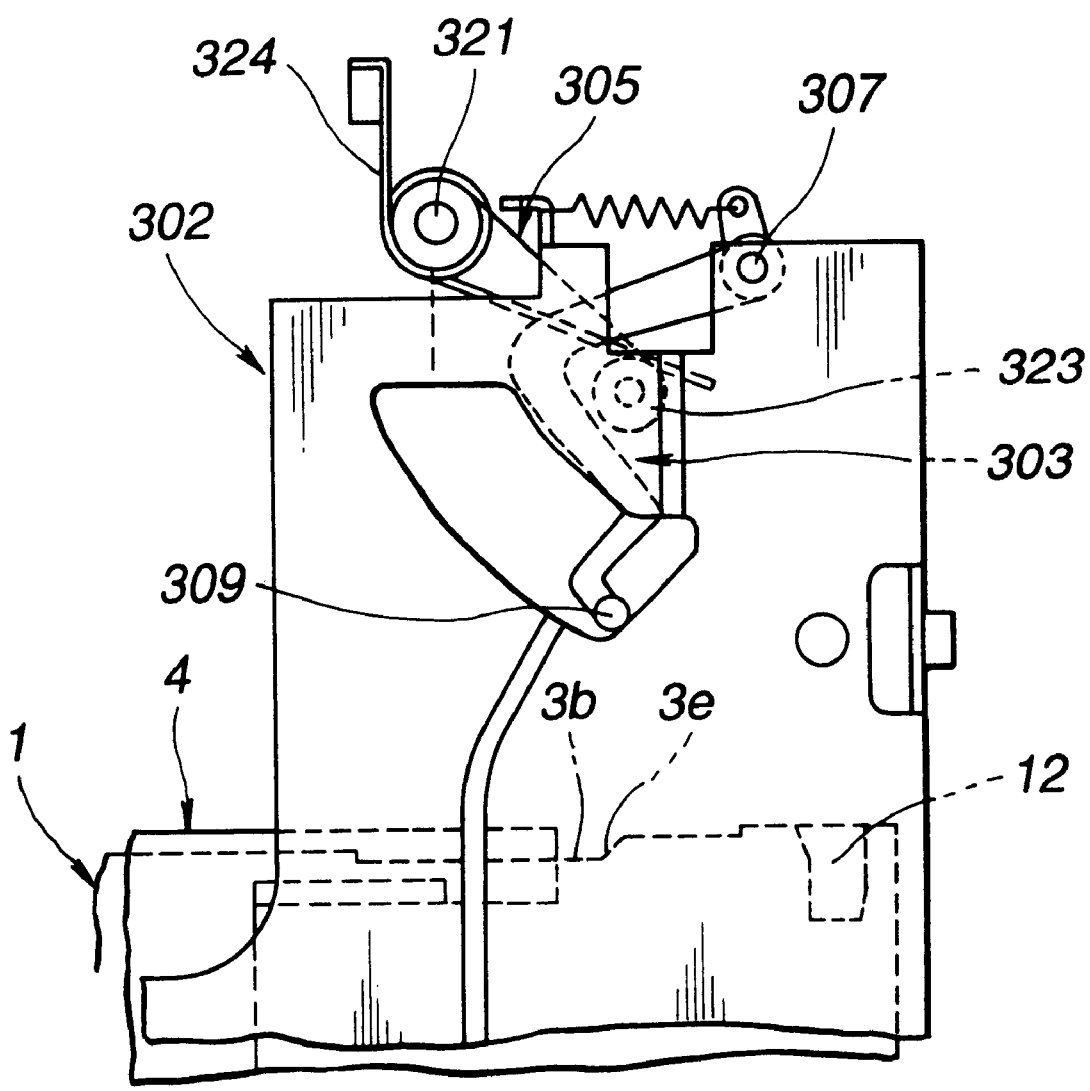
FIG. 29 is a view similar to FIG. 28, showing the second recording-medium cartridge when being properly inserted in a first drive of a separate trigger type.
Figure 30:
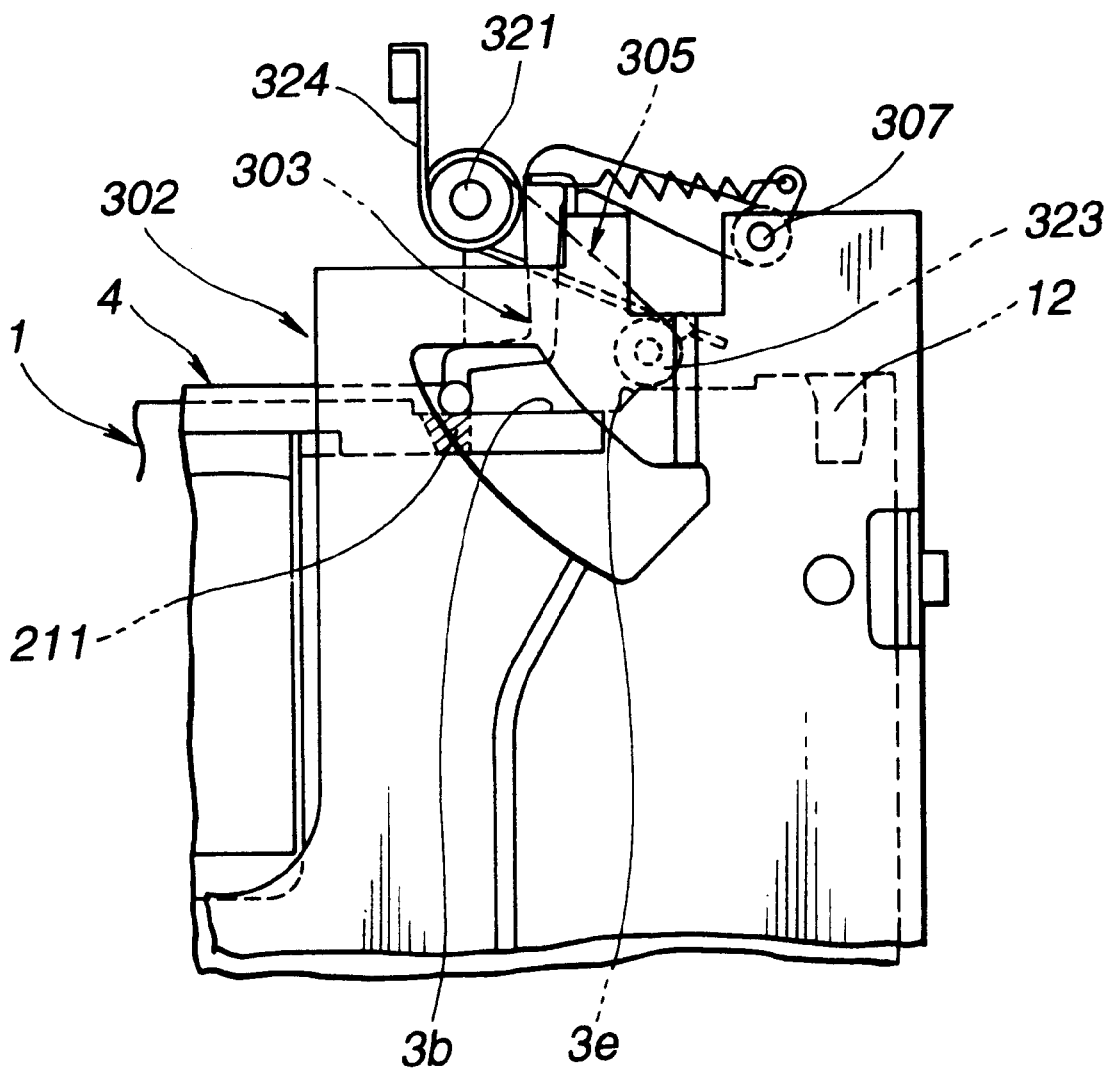
FIG. 30 is a view similar to FIG. 29, showing the second recording-medium cartridge when being properly inserted in the first drive of a separate trigger type.

Referring to FIGS. 29–30, insertion of the second recording-medium cartridge 1 in the drive 301 of a separate trigger type will be described. As described above, the portion 3b of the one side face of the second recording-medium cartridge 1 which is closed by the shutter 4 upon shutter closing and faces outside upon shutter opening is of the same height in its entirety with a portion corresponding to the concavity 211 of the first recording-medium cartridge 201, i.e. a hatched portion in FIG. 30, being closed. When inserting the second recording-medium cartridge 1 in the cartridge holder 302 of the first drive 301 of a separate trigger type, the shutter engaging protrusion 309 of the shutter opening member 303 of the first drive 301 is introduced in the groove 3e formed in the front end face of the second recording-medium cartridge 1. The shutter opening member 303 is rotated against a force of the torsion coil spring to open the shutter 4 of the second recording-medium cartridge 1 by the shutter engaging protrusion 309. When the shutter 4 is opened completely, rotation of the shutter opening member 303 is prevented by a stopper, not shown, to disenable further insertion of the second recording-medium cartridge 1 in the cartridge holder 302. Therefore, the pressed portion 323 of the trigger lever 305 of the first drive 301 is not pressed by the front end face of the second recording-medium cartridge 1, obtaining no removal of lock of the lifting member 304 by the trigger lever 305.

B) Upon misinsertion such as upside-down insertion or reverse insertion

Figure 31:
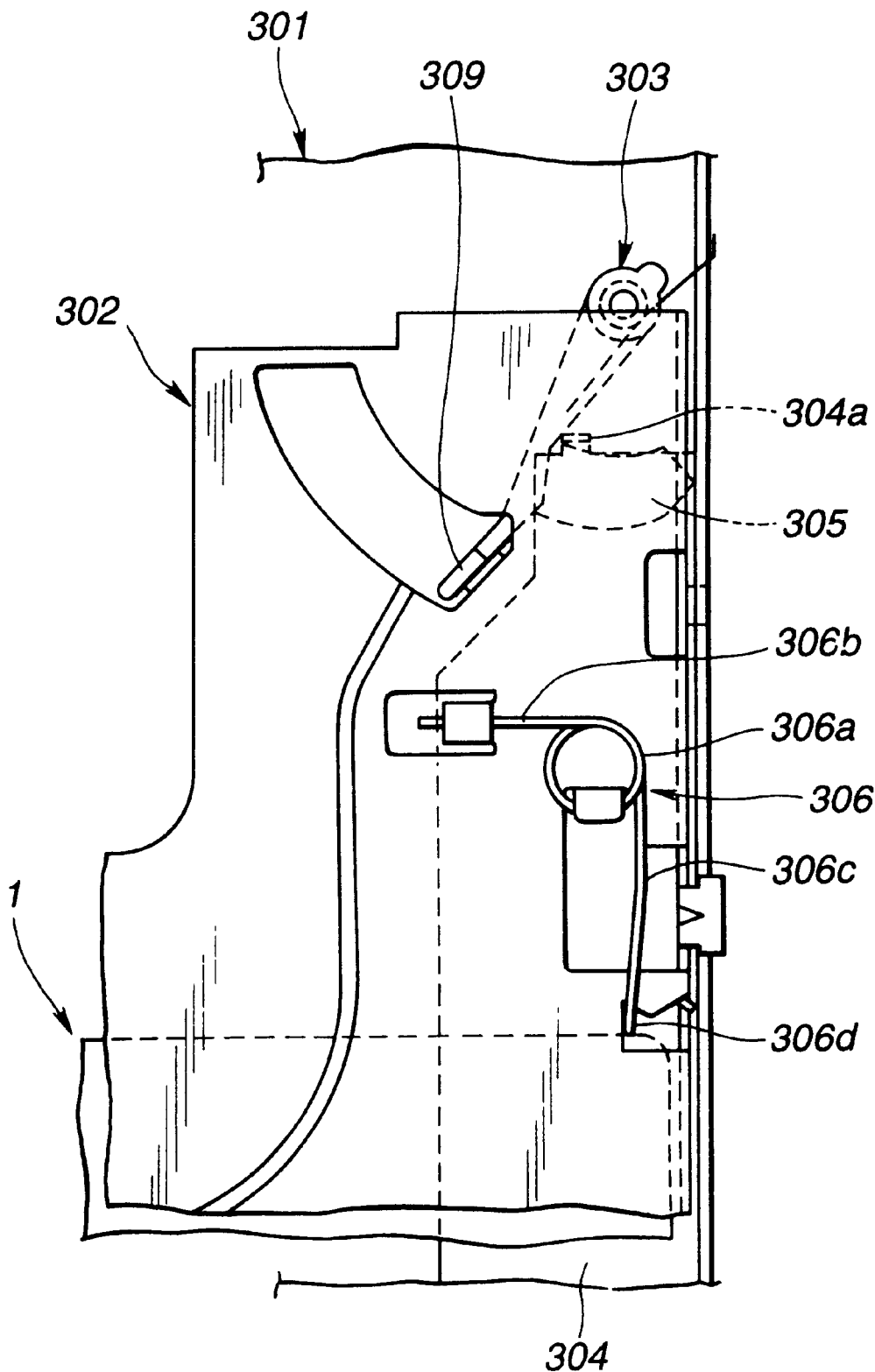
FIG. 31 is a view similar to FIG. 30, showing the second recording-medium cartridge when being inproperly inserted in the first drive of an integrated trigger type.
Figure 32:
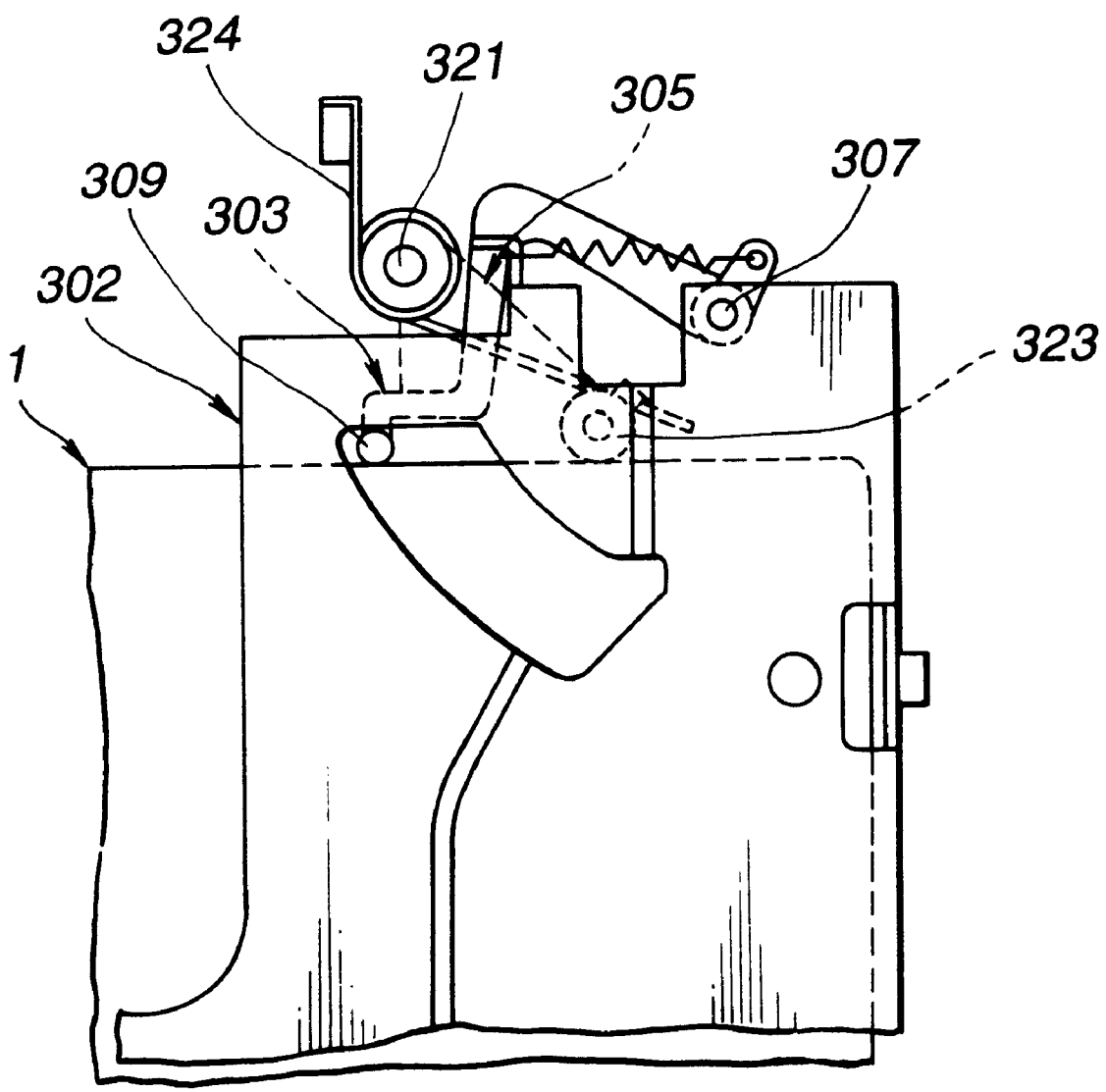
FIG. 32 is a view similar to FIG. 31, showing the second recording-medium cartridge when being inproperly inserted in the first drive of a separate trigger type.

Referring to FIG. 31, when improperly inserting the second recording-medium cartridge 1 in the first drive 301, the head of the second arm 306c of the anti-misinsertion member 306 of the first drive 301 contacts a portion of the end face of the second recording-medium cartridge 1 other than the groove 12, so that the second arm 306c becomes in the stretched state to prevent further insertion of the second recording-medium cartridge 1.

When improperly inserting the second recording-medium cartridge 1 in the first drive 301 of a separate trigger type, the shutter opening member 302 allows insertion of the second recording-medium cartridge 1 before contacting the stopper to disenable rotation thereof. After the shutter opening member 302 contacts the stopper to disenable rotation thereof, insertion of the second recording-medium cartridge 1 in the cartridge holder 302 is prevented to avoid the pressed portion of the trigger lever 305 being pressed.

3) When inserting the first recording-medium cartridge 201 in the second drive 101:

A) Upon insertion in a normal position

Figure 33:
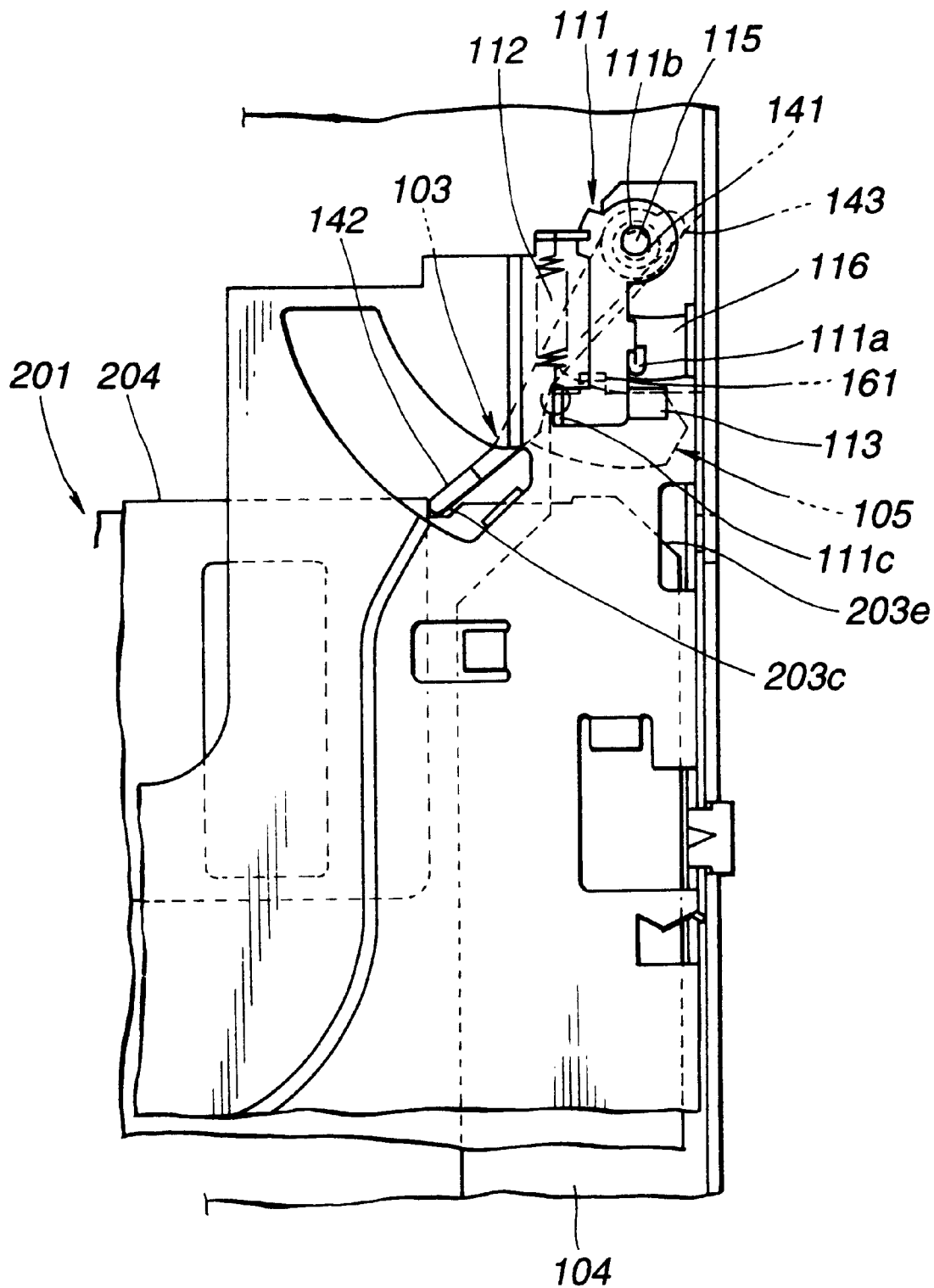
FIG. 33 is a view similar to FIG. 32, showing a first recording-medium cartridge when being inproperly inserted in the second drive.

Referring to FIG. 33, when inserting the first recording-medium cartridge 201 in the cartridge holder 102 of the second drive 101, the shutter engaging protrusion 142 of the shutter opening member 103 is introduced in the groove 203c formed in the front end face of the first recording-medium cartridge 201. Thus, the shutter opening member 103 is rotated against a force of the torsion coil spring 143 to open the shutter 204 of the first recording-medium cartridge 201 by the shutter engaging protrusion 142.

Figure 34:
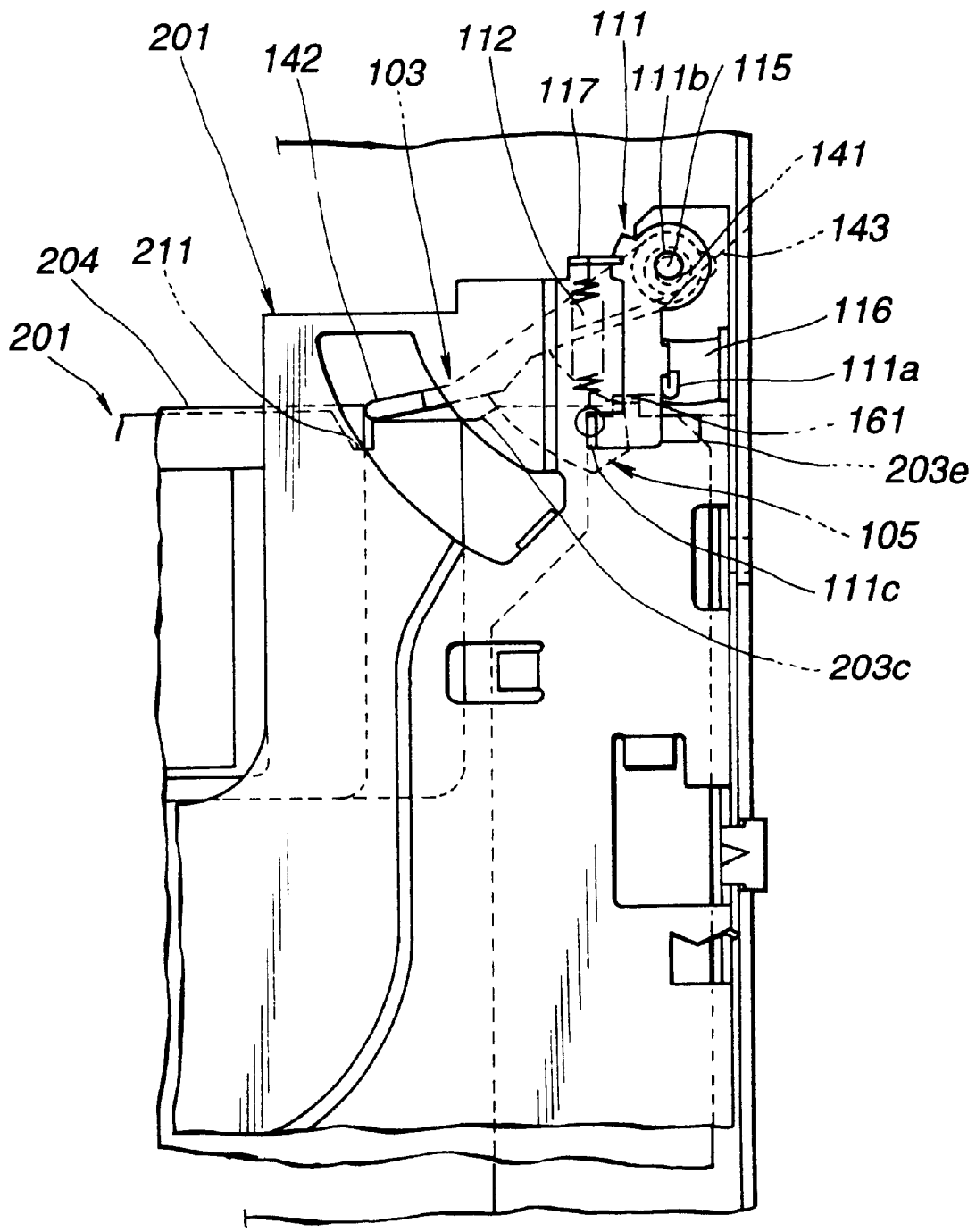
FIG. 34 is a view similar to FIG. 33, showing the first recording-medium cartridge when being properly inserted in the second drive.
Figure 35:
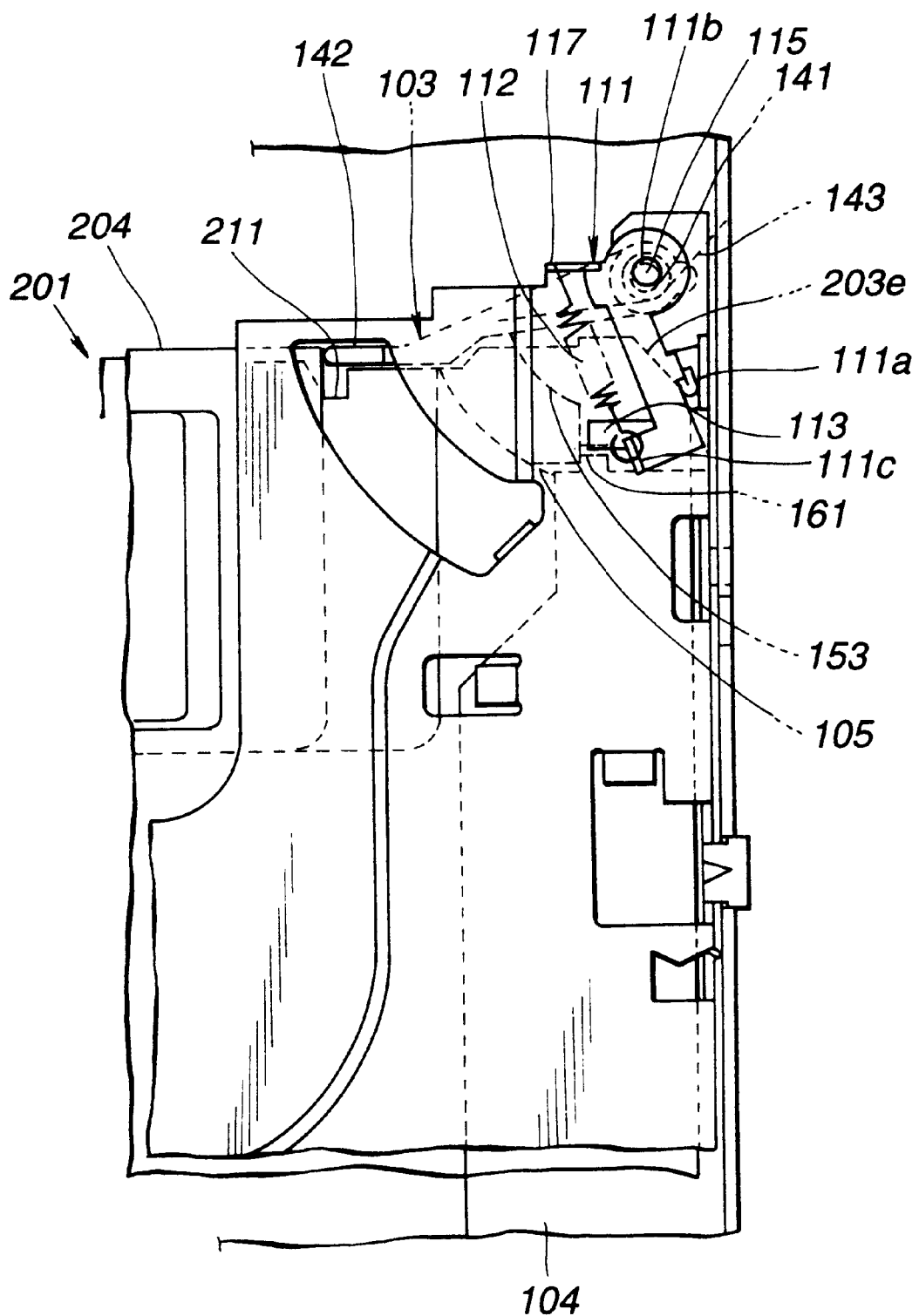
FIG. 35 is a view similar to FIG. 34, showing the first recording-medium cartridge when being properly inserted in the second drive.

Referring to FIGS. 34–35, when inserting further the first recording-medium cartridge 201 in the cartridge holder 102, the protrusion 111a of the anti-misinsertion member 111 of the second drive 101 contacts the inclination 203e of the first recording-medium cartridge 201, and it turns to the outside of the first recording-medium cartridge 201 along the inclination 203e, cancelling a function of the anti-misinsertion member 111 or stopper. Therefore, the first recording-medium cartridge 201 is entered further in the cartridge holder 102. And as soon as the shutter 4 is opened by the shutter opening member 103, engagement of the engagement 153 of the trigger member 105 with the engaged portion 161 of the lifting member 104 is released to remove lock of the lifting member 104 by the trigger member 105. Thus, the lifting member 104 is slid by forces of the coil springs 164 to move downward the cartridge holder 102, disposing the center hub 22 of the second recording-medium cartridge 1 on the spindle 171 of the second drive 101.

B) Upon misinsertion such as upside-down insertion or reverse insertion

Figure 36:
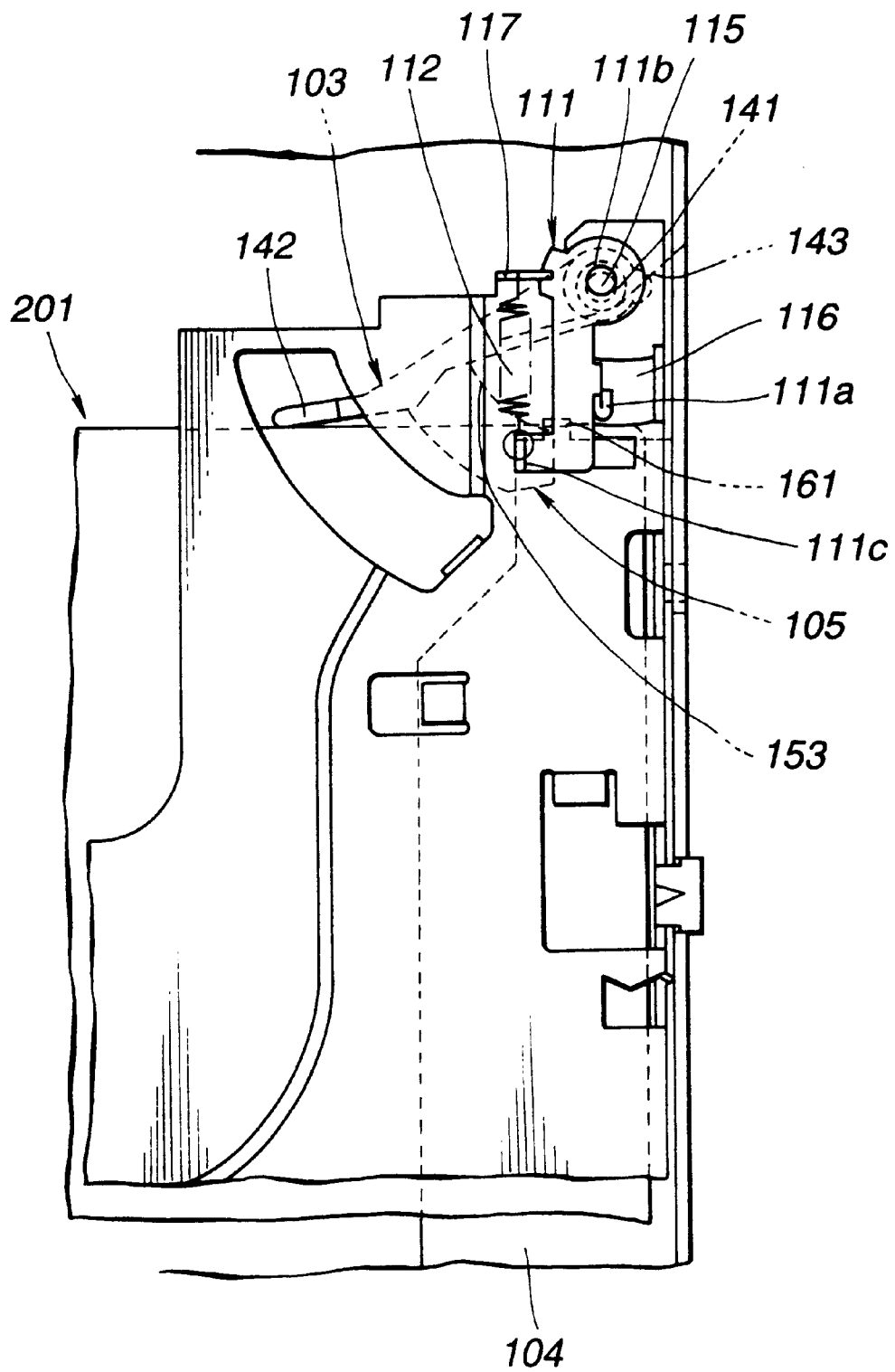
FIG. 36 is a view similar to FIG. 35, showing the first recording-medium cartridge when being inproperly inserted in the second drive.

Referring to FIG. 36, when improperly inserting the first recording-medium cartridge 201 in the second drive 101, the protrusion lila of the anti-misinsertion member 111 contacts a portion of the end face of the first recording-medium cartridge 201 other than the inclination 203e, so that the anti-misinsertion member 111 becomes in the stretched state to prevent further insertion of the first recording-medium cartridge 201.

Figure 37A:
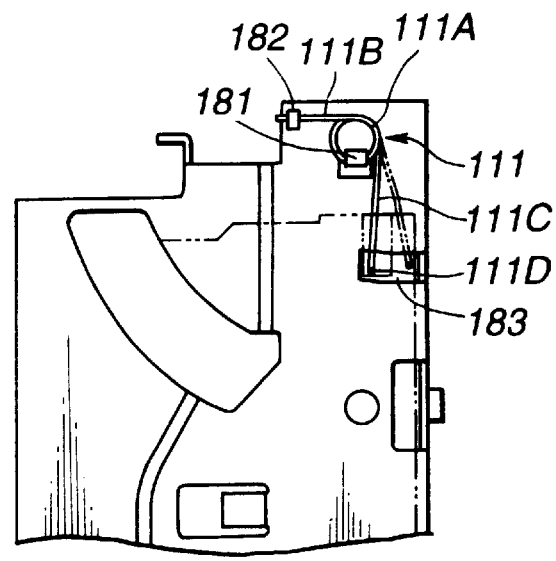
FIGS. 37A–37C are views similar to FIG. 26, showing variants of an anti-misinsertion member.
Figure 37B:
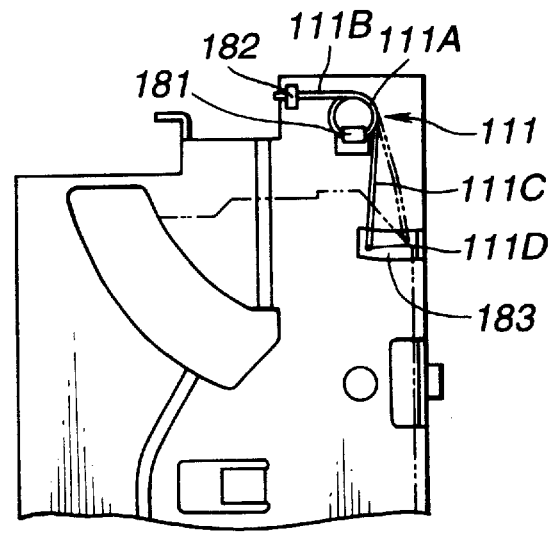
Figure 37C:
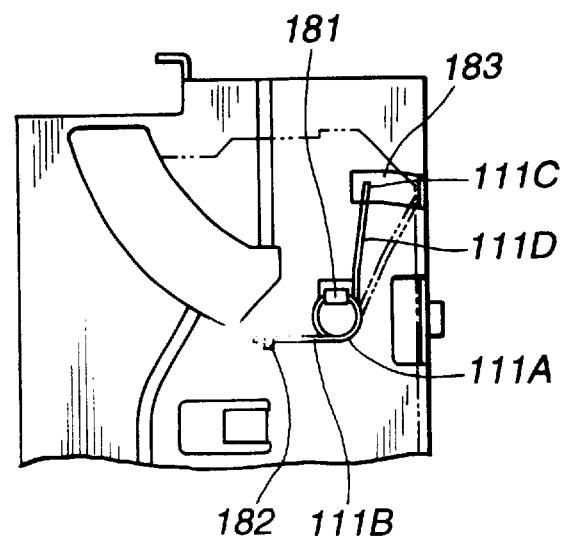
Figure 38:
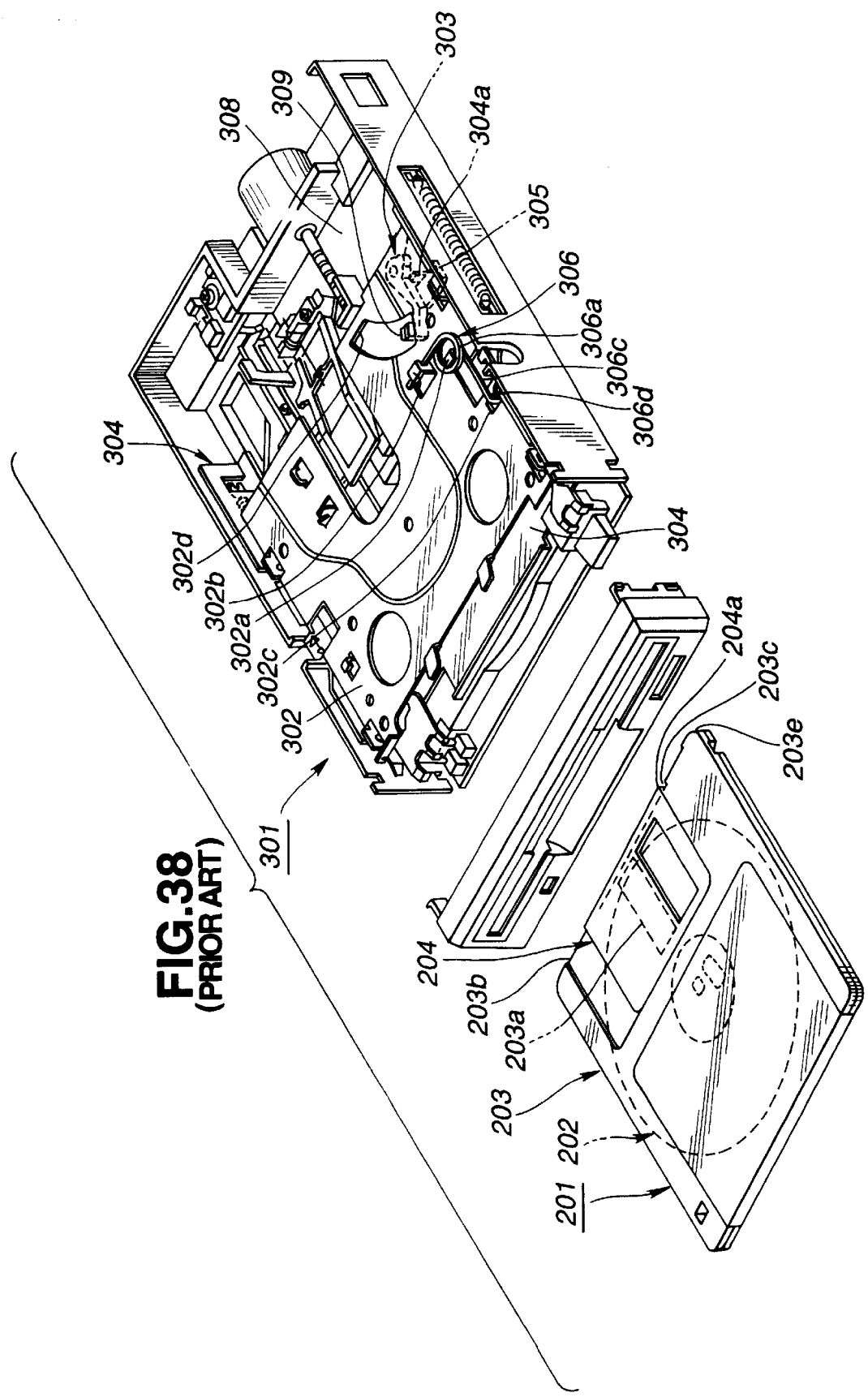
FIG. 38 is a view similar to FIG. 3, showing a known first recording-medium cartridge and first drive.
Figure 39:
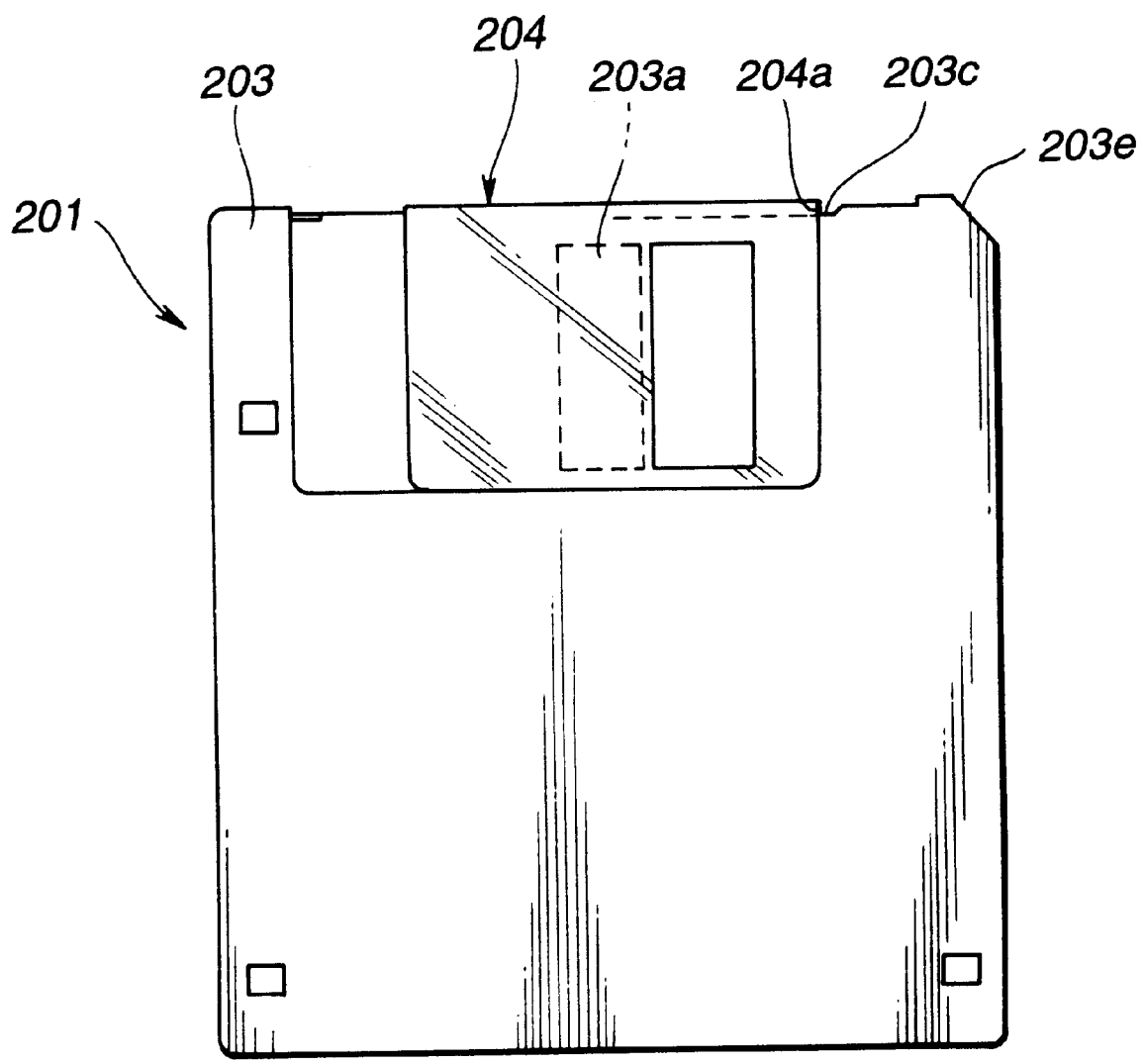
FIG. 39 is a view similar to FIG. 37C, showing the known first recording-medium cartridge.
Figure 40:
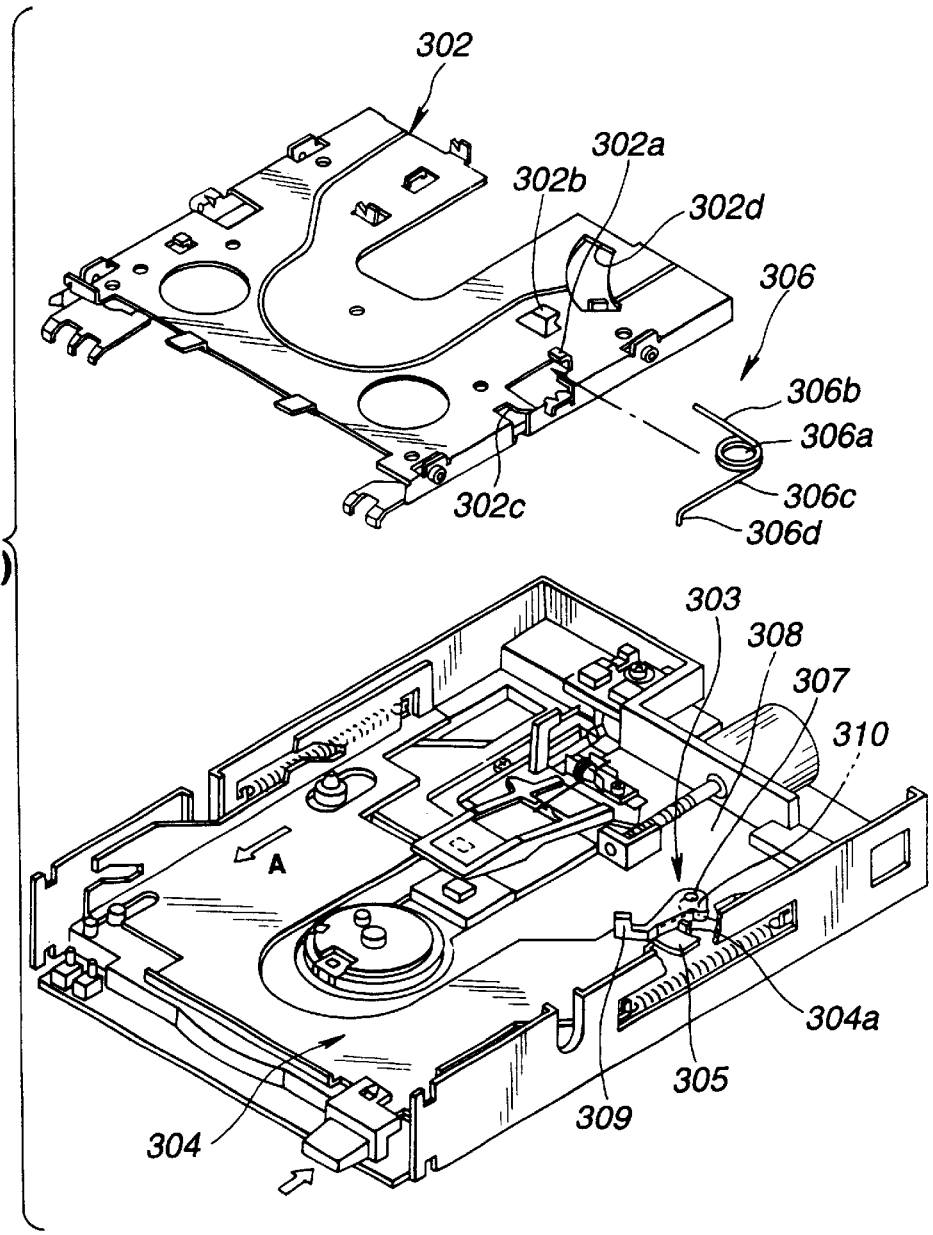
FIG. 40 is a view similar to FIG. 18, showing the known first drive.
Figure 41:
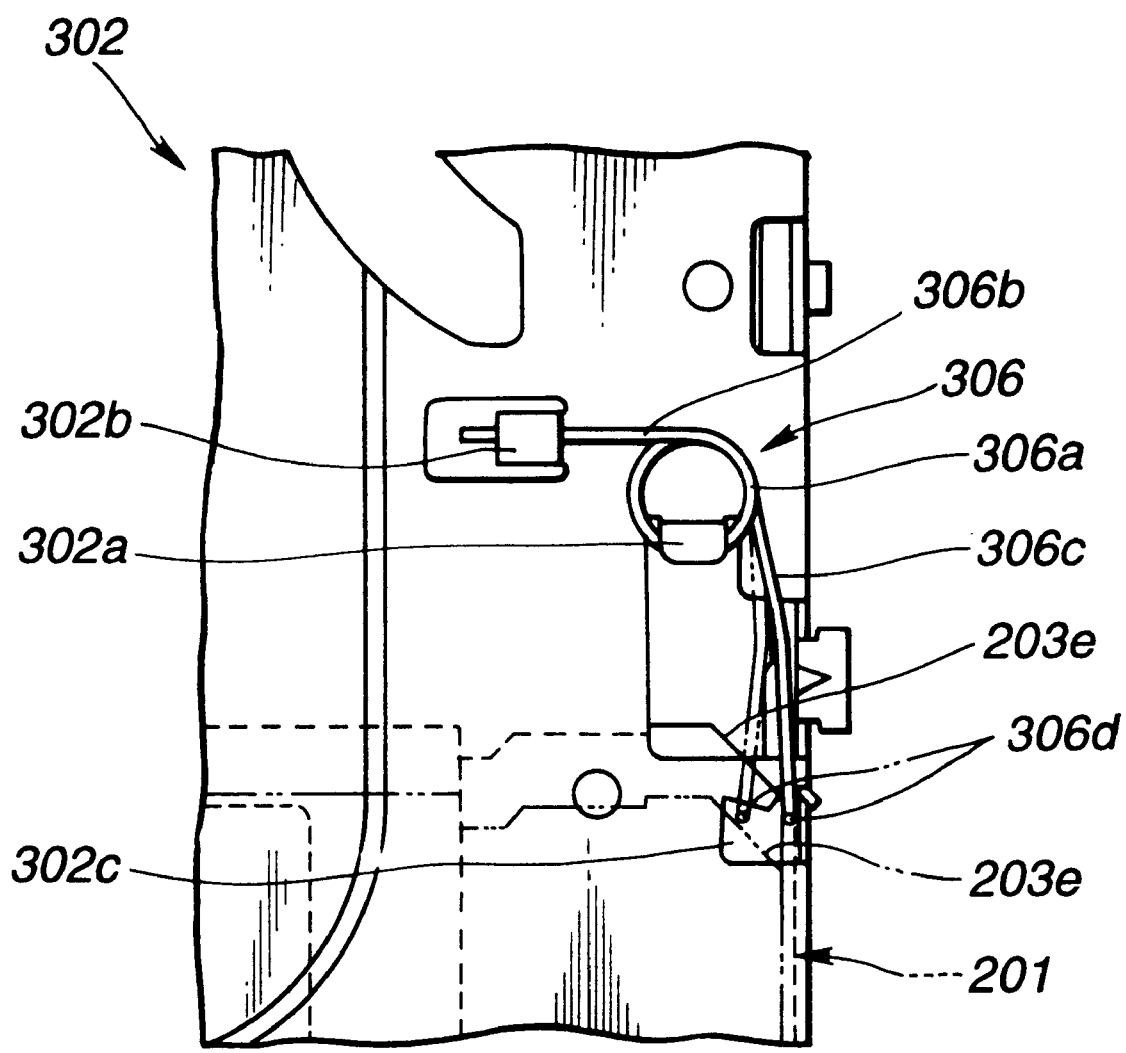
FIG. 41 is a view similar to FIG. 36, showing the known first recording-medium cartridge when being properly inserted in the known first drive.
Figure 42:
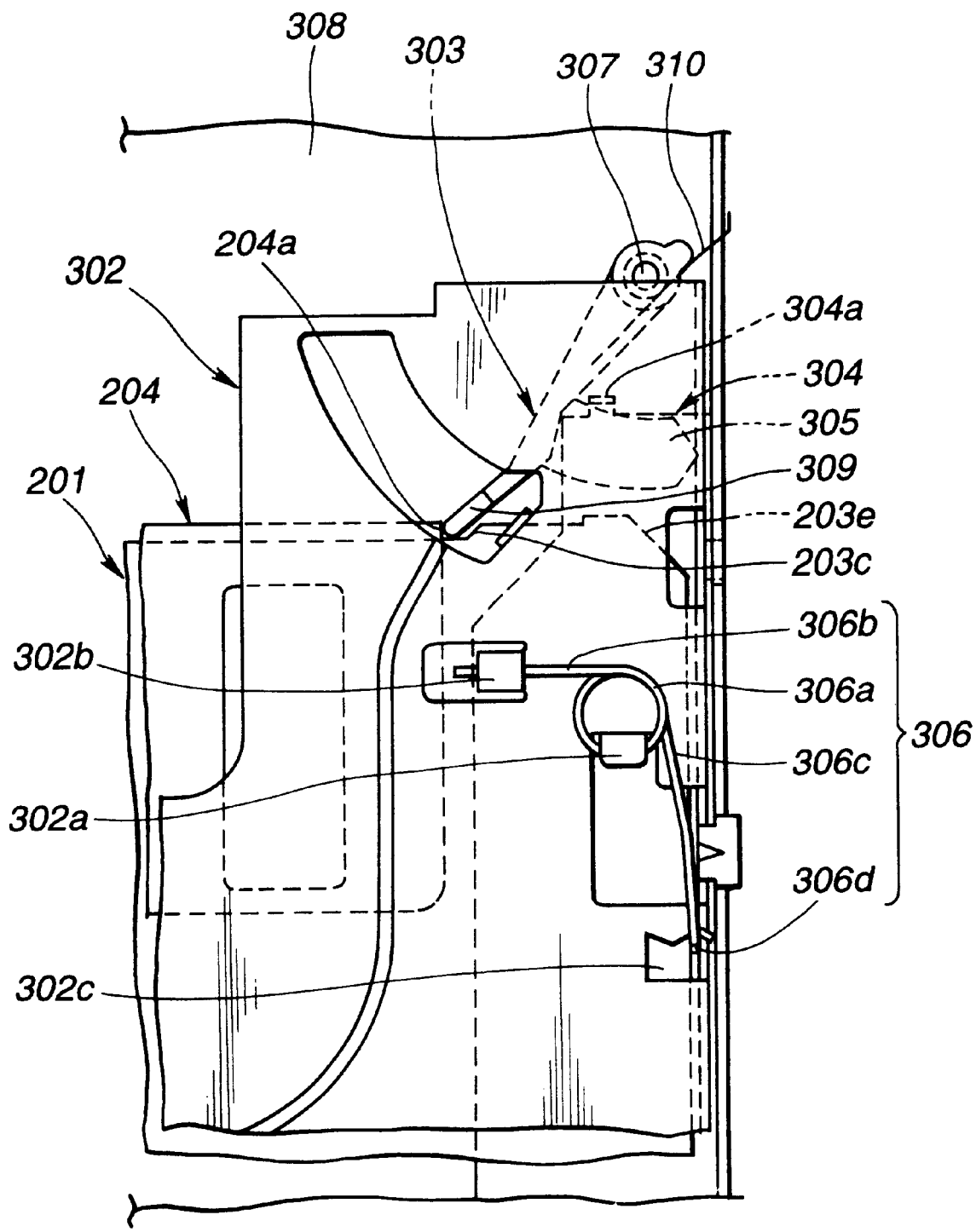
FIG. 42 is a view similar to FIG. 41, showing the known first recording-medium cartridge when being properly inserted in the known first drive.
Figure 43:
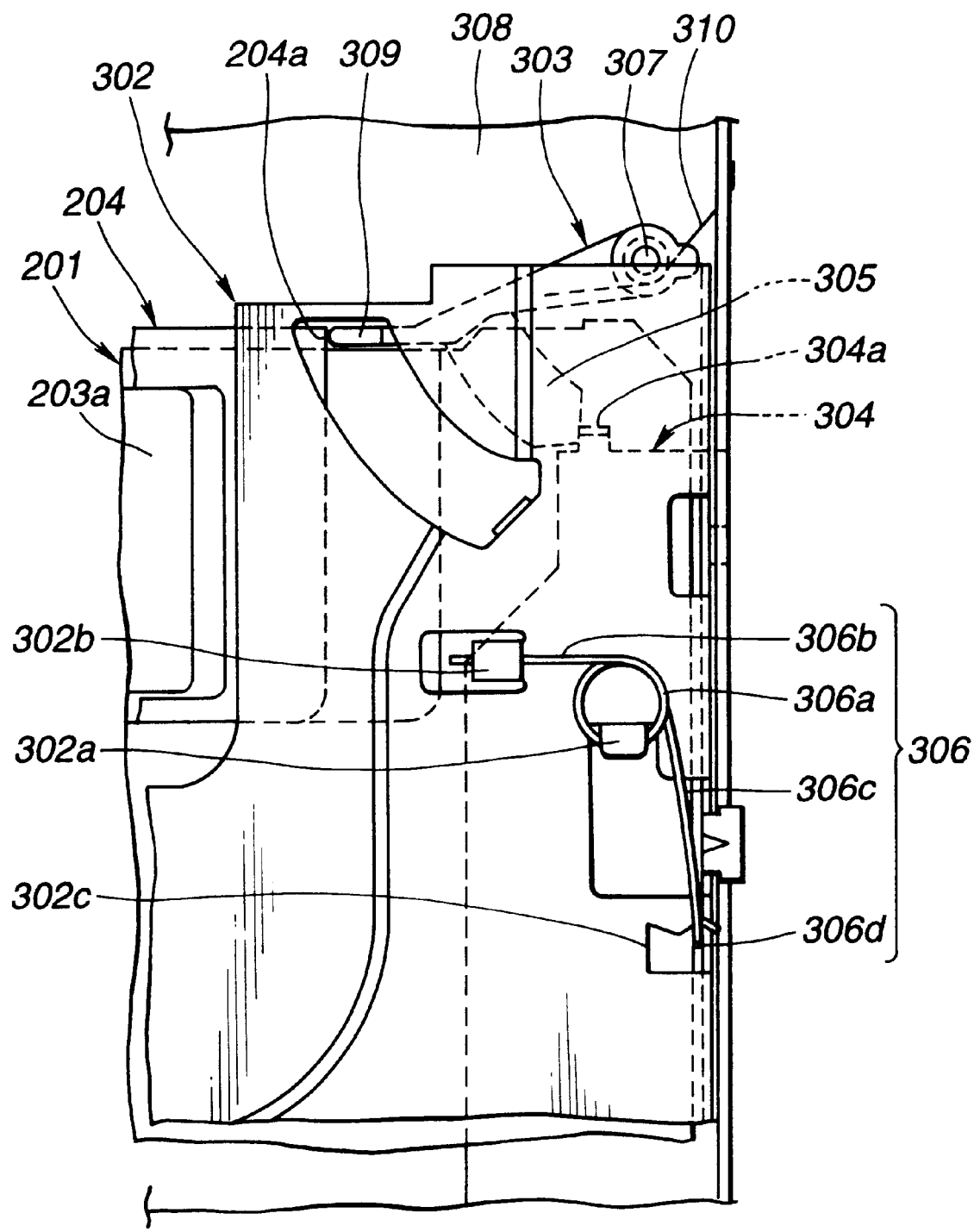
FIG. 43 is a view similar to FIG. 42, showing the known first recording-medium cartridge when being properly inserted in the known first drive.
Figure 44:
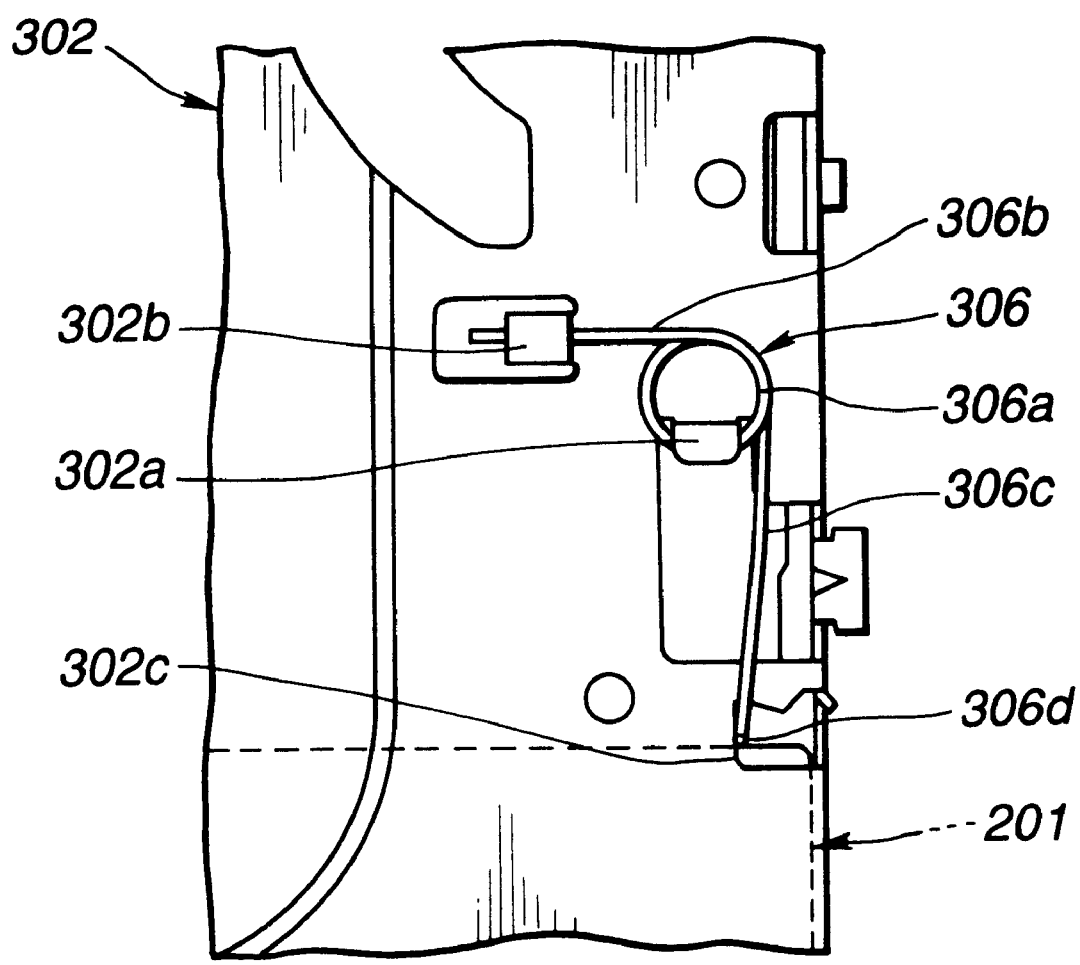
FIG. 44 is a view similar to FIG. 43, showing the known first recording-medium cartridge when being improperly inserted in the known first drive.

FIGS. 37A–37C show variants of the anti-misinsertion member 111. In the variants, the anti-misinsertion member 111, which is in the form of a torsion coil spring, includes a coil 11A, a first arm 111B, and a second arm 111C substantially perpendicular thereto with respect to the coil 111A. The coil 111A is engaged with the upper side of the cartridge holder 102 by a coil engagement 181. The first arm 111B is engaged with the upper side of the cartridge holder 102 by an arm engagement 182. The second arm 111C has an end bent downward substantially perpendicularly and formed with a protrusion 111D. The protrusion 111D protrudes in the cartridge holder 102 through a recess 183 formed in the upper side of the cartridge holder 102.

Referring to FIG. 37A, when inserting in the cartridge holder 102 the second recording-medium cartridge 1 in a normal position, the protrusion 111D formed at the end of the second arm 111C is introduced in the groove 12 of the anti-misinsertion portion 11 of the second recording-medium cartridge 1, allowing loading of the second recording-medium cartridge 1 into the second drive 101. Referring to FIG. 37B, when inserting in the cartridge holder 102 the first recording-medium cartridge 201 in a normal position, the protrusion 111D of the second arm 111C contacts the inclination 203e of the, so that the second arm 111C turns to the outside of the shell 203 by the inclination 203e, allowing loading of the first recording-medium cartridge 201.

The protrusion 111D of the second arm 111C may be disposed upstream of the coil 111A as viewed in the direction of insertion as shown in FIGS. 27A–37B, or downstream thereof as shown in FIG. 37C. This variant uses a torsion coil spring as the anti-misinsertion member 111, enabling a reduction in the number of parts and assembling processes, resulting in reduced manufacturing cost.

Having described the present invention with regard to the preferred embodiment, it is noted that the present invention is not limited thereto, and various changes and modifications can be made without departing from the scope of the present invention.

What is claimed is:

1. A system, comprising:

a first cartridge with a recording medium of a first format, said first cartridge having an anti-misinsertion portion including an inclination of a corner of a front end face of said first cartridge;

a first drive for said first cartridge, the first drive including a cartridge holder for holding and vertically moving the first cartridge between a first position and a second position;

a second cartridge with a recording medium of a second format, the second drive including a grooved anti-misinsertion portion of a front end face of said second cartridge;

a second drive for said first cartridge and said second cartridge, the second drive including a cartridge holder for holding and vertically moving either of the first cartridge and the second cartridge between a third position and a fourth position;

wherein said second drive includes anti-misinsertion means for cooperating with said first anti-misinsertion portion to allow loading of said first cartridge into said second drive when said first cartridge is inserted in a normal position and for cooperating with said grooved anti-misinsertion portion of said second cartridge to allow loading of said second cartridge into said second drive when said second cartridge is inserted in a normal position.

2. The system as claimed in claim 1, wherein the anti-misinsertion means comprises an anti-misinsertion member rotatably mounted to said cartridge holder of said second drive and formed with a protrusion, and wherein said cartridge holder includes means for biasing said anti-misinsertion member to rotate in a first direction, wherein when inserting in said second drive said first cartridge in said normal position, said anti-misinsertion member is engaged with said anti-misinsertion portion to rotate said anti-misinsertion member in a second direction against said biasing means to allow loading of said first cartridge into said second drive, and wherein when inserting in said second drive said second cartridge in said normal position, said anti-misinsertion member is inserted in said grooved anti-misinsertion portion to allow loading of said second cartridge into said second drive.

3. The system as claimed in claim 1, wherein said first cartridge comprises a first shell and a first shutter slidably mounted to said first shell at a front end thereof, said front end of said first shell having a portion thereof closed by said first shutter upon shutter closing and facing outside upon shutter opening, said portion being formed with a groove, said second cartridge comprising a second shell and a second shutter slidably mounted to said second shell at a front end thereof, said front end of said second shell having a portion closed by said shutter upon shutter closing and facing outside upon shutter opening, said portion being of the same height in its entirety, said first drive further comprises an opening member mounted to said cartridge holder of said first drive for opening said shutter of said first cartridge, a moving member for vertically moving said cartridge holder of said first drive, a trigger member for removing, when pressed by a front end face of said first cartridge inserted in said cartridge holder of said first drive, a lock for said moving member of said first drive to allow said moving member to move downward said cartridge holder of said first drive to said loading position, said second drive further comprises an opening member mounted to said cartridge holder of said second drive for opening said shutter of either of said first cartridge and second cartridge, a moving member for vertically moving said cartridge holder of said second drive, a trigger member for removing, when pressed by a front end face of either of said first cartridge and second cartridge inserted in said cartridge holder of said second drive, a lock for said moving member of said second drive to allow said moving member to move downward said cartridge holder of said second drive to said loading position, said first drive being constructed such that when inserting in said first drive said first cartridge in said normal position, the lock for said trigger member of said first drive is removed in a first position so that said opening member of said first drive is introduced in said groove of said first cartridge, said second drive being constructed such that when inserting in said cartridge holder of said second drive one of said first and second cartridges in said normal position, the lock for said trigger member of said second drive is removed regardless of an existence of said portion being formed with a groove.

* * * * *

UNITED STATES PATENT AND TRADEMARK OFFICE
CERTIFICATE OF CORRECTION

PATENT NO. : 6,288,869 B1
DATED : September 11, 2001
INVENTOR(S) : Hideaki Kumagai Page 1 of 1

It is certified that error appears in the above-identified patent and that said Letters Patent is hereby corrected as shown below:

Column 2,
Line 28, change "206d" to -- 306d --.

Column 7,
Line 65, change "snell" to -- shell --.

Column 10,
Line 18, change "Lorces" to -- forces --.

Column 13,
Line 22, change "lila" to -- 111a --;
Line 51, delete "of the."

Signed and Sealed this

Twenty-eighth Day of May, 2002

Attest:

JAMES E. ROGAN
Attesting Officer
Director of the United States Patent and Trademark Office